United States Patent
Spindler et al.

(10) Patent No.: US 12,368,799 B2
(45) Date of Patent: *Jul. 22, 2025

(54) AUTOMATED SILENT NETWORK AUTHENTICATION PROTOCOL

(71) Applicant: IQX CORP., Carson City, NV (US)

(72) Inventors: Sacha Spindler, Prague (CZ); Aidan Wright, Tigard, OR (US)

(73) Assignee: IQX CORP., Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/984,041

(22) Filed: Dec. 17, 2024

(65) Prior Publication Data

US 2025/0119493 A1   Apr. 10, 2025

Related U.S. Application Data

(63) Continuation of application No. 18/896,197, filed on Sep. 25, 2024, now Pat. No. 12,200,165, which is a
(Continued)

(51) Int. Cl.
*H04M 1/72436* (2021.01)
*H04M 1/72445* (2021.01)
(Continued)

(52) U.S. Cl.
CPC ... *H04M 1/72445* (2021.01); *H04M 1/72436* (2021.01); *H04W 4/14* (2013.01); *H04W 4/20* (2013.01); *H04W 12/06* (2013.01)

(58) Field of Classification Search
CPC ......... H04M 1/72445; H04M 1/72436; H04W 4/14; H04W 4/20; H04W 12/06
See application file for complete search history.

(56) References Cited

U.S. PATENT DOCUMENTS

| 6,101,486 A | 8/2000 | Roberts et al. |
|---|---|---|
| 7,197,324 B2 | 3/2007 | Sweeney |

(Continued)

OTHER PUBLICATIONS

International Search Report dated Dec. 13, 2019 re PCT/US19/52847 (2 pages).
Written Opinion dated Dec. 13, 2019 re PCT/US19/52847 (5 pages).

*Primary Examiner* — Joseph E Dean, Jr.
(74) *Attorney, Agent, or Firm* — Aurora Consulting LLC; Kristen J. Hansen; Ashley Sloat

(57) ABSTRACT

Systems and methods are described for receiving a request to provide content to at least one authorized recipient; generating a customized message comprising at least one action associated with the content; causing transmission of the customized message to a mobile computing device associated with the at least one authorized recipient, requesting authorization data corresponding to the at least one authorized recipient; responsive to receiving the requested authorization data: verifying that the authorization data correlates to an identity of the at least one authorized recipient or an identity of the mobile computing device; determining a classification of the at least one authorized recipient; and generating a Rich Communication Service (RCS) message comprising the content; and scheduling, using a machine learning model and based on the determined classification, delivery of the RCS message to the mobile computing device.

30 Claims, 18 Drawing Sheets

Related U.S. Application Data continuation-in-part of application No. 18/483,670, filed on Oct. 10, 2023, now Pat. No. 12,126,752, which is a continuation of application No. 18/193,163, filed on Mar. 30, 2023, now Pat. No. 11,876,924, which is a continuation of application No. 17/279,188, filed as application No. PCT/US2019/052847 on Sep. 25, 2019, now Pat. No. 11,765,262.

(60) Provisional application No. 62/737,315, filed on Sep. 27, 2018.

(51) Int. Cl.
    *H04W 4/14* (2009.01)
    *H04W 4/20* (2018.01)
    *H04W 12/06* (2021.01)

(56) References Cited

U.S. PATENT DOCUMENTS

| | | | |
|---|---|---|---|
| 8,131,258 B2 | 3/2012 | Smith et al. | |
| 8,195,509 B1 | 6/2012 | Mhatre et al. | |
| 8,630,670 B2 | 1/2014 | Sweeney | |
| 8,655,782 B2 | 2/2014 | Poon et al. | |
| 8,700,729 B2 | 4/2014 | Dua | |
| 9,053,189 B2 | 6/2015 | Hoag et al. | |
| 9,143,831 B1 | 9/2015 | Hendren et al. | |
| 9,549,073 B2 | 1/2017 | Zitnik et al. | |
| 10,122,824 B1 | 11/2018 | Chokhawala et al. | |
| 10,298,739 B2 * | 5/2019 | Lee | H04W 4/12 |
| 10,699,264 B1 | 6/2020 | Barman | |
| 11,158,009 B2 | 10/2021 | Barman | |
| 11,170,380 B1 * | 11/2021 | Long | G06Q 30/0271 |
| 11,250,098 B2 | 2/2022 | Chokhawala et al. | |
| 11,301,219 B2 | 4/2022 | DeTella et al. | |
| 11,443,325 B2 | 9/2022 | Kallugudde et al. | |
| 2003/0191945 A1 | 10/2003 | Keech | |
| 2004/0230536 A1 | 11/2004 | Fung et al. | |
| 2007/0174448 A1 | 7/2007 | Ahuja et al. | |
| 2007/0255620 A1 | 11/2007 | Tumminaro et al. | |
| 2007/0288323 A1 | 12/2007 | Halevy | |
| 2010/0113072 A1 * | 5/2010 | Gibson | H04W 4/14 455/564 |
| 2011/0218880 A1 | 9/2011 | Hammad et al. | |
| 2012/0185382 A1 | 7/2012 | Fischer | |
| 2012/0203605 A1 | 8/2012 | Morgan et al. | |
| 2013/0080319 A1 * | 3/2013 | Greenstone | G06Q 30/0222 705/39 |
| 2014/0187197 A1 | 7/2014 | Sege | |
| 2017/0256007 A1 | 9/2017 | Barman | |
| 2017/0295414 A1 | 10/2017 | Murray et al. | |
| 2018/0005263 A1 | 1/2018 | McNulty et al. | |
| 2018/0103004 A1 | 4/2018 | Demir et al. | |
| 2019/0141039 A1 * | 5/2019 | Stoops | H04W 12/06 |
| 2023/0077942 A1 | 3/2023 | Crutchington et al. | |

* cited by examiner

AUTOMATED SILENT NETWORK AUTHENTICATION PROTOCOL

CROSS-REFERENCE TO RELATED APPLICATIONS

This application is a continuation of U.S. application Ser. No. 18/896,197, filed Sep. 25, 2024, which is a continuation-in-part of U.S. application Ser. No. 18/483,670, filed Oct. 10, 2023, which is a continuation of U.S. application Ser. No. 18/193,163, filed Mar. 30, 2023, which is a continuation of U.S. application Ser. No. 17/279,188, filed Mar. 24, 2021, which is a U.S. National Stage Entry of PCT/US19/52847, filed Sep. 25, 2019, that claims the priority benefit of U.S. Provisional Patent Application Ser. No. 62/737,315, filed Sep. 27, 2018, the contents of each of which are herein incorporated by reference in their entireties.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of security and access control for cellular handheld devices.

BACKGROUND

The described embodiments relate, generally, to techniques for performing transactions using dynamically generated customized webpages. The ease of use and widespread availability of networks, such as the Internet, have made it much easier for people to perform online transactions, such as purchasing products or services (which are sometimes referred to as 'e-commerce'). However, the popularity of such online transactions has resulted in increased incidents of fraud and other criminal activity. This criminal behavior undermines people's trust and, thus, constrains people's willingness to conduct transactions via networks.

Moreover, many webpages or websites have largely static content that is presented or served to all visitors. For example, visitors to a particular web site may be steered to a common landing webpage. While this one-size-fits-all approach is efficient and can be easily scaled, it often results in a cumbersome user experience, as visitors are forced to navigate through the content on a webpage or website in an attempt to find relevant or interesting information. Consequently, the negative user experience associated with many webpages and websites also restricts use and, thus, people's willingness to conduct transactions.

SUMMARY

There is a need for new and useful systems and methods for providing secure access and authentication when using mobile devices to access and/or purchase content. In some aspects, the techniques described herein relate to a computer-implemented method including: receiving a request to provide content to at least one authorized recipient; generating a customized message including at least one action associated with the content; causing transmission of the customized message to a mobile computing device associated with the at least one authorized recipient; responsive to receiving an indication associated with selecting the at least one action, requesting authorization data corresponding to the at least one authorized recipient; responsive to receiving the requested authorization data: verifying that the authorization data correlates to an identity of the at least one authorized recipient or an identity of the mobile computing device; determining, based on the identity of the at least one authorized recipient or the identity of the mobile computing device, a classification of the at least one authorized recipient; and generating a Rich Communication Service (RCS) message including the content; and scheduling, using a machine learning model and based on the determined classification, delivery of the RCS message to the mobile computing device.

In some aspects, the techniques described herein relate to a computer-implemented method, further including: delivering the RCS message to the mobile computing device according to the scheduled delivery.

In some aspects, the techniques described herein relate to a computer-implemented method, wherein the content includes a carousel of selectable options in a user interface of the mobile computing device, the selectable options including performing at least one secure transaction, scheduling an appointment, or resuming at least one abandoned user journey.

In some aspects, the techniques described herein relate to a computer-implemented method, wherein the content is provided in the user interface and the user interface is within a browser executing on the mobile computing device.

In some aspects, the techniques described herein relate to a computer-implemented method, wherein the content includes send and receive indicators provided in a user interface of the mobile computing device that indicate real time typing between an RCS message provider and the mobile computing device or between another computing device and the mobile computing device.

In some aspects, the techniques described herein relate to a computer-implemented method, further including: determining a sender of the RCS message; responsive to failing to authorize the determined sender of the RCS message, delivering, according to the scheduled delivery, an SMS message indicating a warning about the RCS message.

In some aspects, the techniques described herein relate to a computer-implemented method, wherein the at least one action associated with the content includes one or more options to: perform a transaction, select a suggested response, return to a prior browsing session, or return to a prior application session.

In some aspects, the techniques described herein relate to an automated messaging subscription and distribution system, the system including: a processor; and memory configured to store program instructions, wherein, when executed by the processor, the program instructions cause the processor to perform operations including: receiving a request to provide content to at least one service subscriber; generating a customized message including at least one action associated with the content; causing transmission of the customized message to a mobile computing device associated with the at least one service subscriber; responsive to receiving an indication associated with selecting the at least one action, requesting subscription data corresponding to the at least one service subscriber; responsive to receiving the requested subscription data: verifying that the subscription data correlates to an identity of the at least one service subscriber or an identity of the mobile computing device; determining, based on the identity of the at least one service subscriber or the identity of the mobile computing device, a classification of the at least one subscriber; and generating, based on the determined classification, a Rich Communication Service (RCS) message including the content; and scheduling, using a machine learning model and based on the determined classification, delivery of the RCS message to the mobile computing device.

In some aspects, the techniques described herein relate to a system, wherein the content includes a carousel of selectable options in a user interface of the mobile computing device, the selectable options including performing at least one secure transaction, scheduling an appointment, or resuming at least one abandoned user journey.

In some aspects, the techniques described herein relate to a system, wherein the content is provided in the user interface and the user interface is within a browser executing on the mobile computing device.

In some aspects, the techniques described herein relate to a system, wherein the content includes send and receive indicators provided in a user interface of the mobile computing device that indicate real time typing between an RCS message provider and the mobile computing device or between another computing device and the mobile computing device.

In some aspects, the techniques described herein relate to a system, wherein the operations further include: determining a sender of the RCS message; responsive to failing to authorize the determined sender of the RCS message, delivering, according to the scheduled delivery, an SMS message indicating a warning about the RCS message.

In some aspects, the techniques described herein relate to a system, wherein the at least one action associated with the content includes one or more options to: perform a transaction, select a suggested response, return to a prior browsing session, or return to a prior application session.

In some aspects, the techniques described herein relate to a non-transitory computer-readable storage medium for use in conjunction with a computer, the computer-readable storage medium storing program instructions that, when executed by the computer, cause the computer to carry out one or more operations including: receive a request to provide content to at least one authorized recipient or subscriber; generate a customized message including at least one link associated with the content; cause transmission of the customized message to a mobile computing device associated with the at least one authorized recipient or subscriber; responsive to receiving an indication associated with selecting the at least one link, request subscription data corresponding to the at least one authorized recipient or subscriber; responsive to receiving the requested subscription data: verify that the subscription data correlates to an identity of the at least one authorized recipient or subscriber or an identity of the mobile computing device; determine, based on the identity of the at least one authorized recipient or subscriber or the identity of the mobile computing device, a classification of the at least one authorized recipient or subscriber; and generating a Rich Communication Service (RCS) message including the content; and scheduling, using a machine learning model and based on the determined classification, delivery of the RCS message to the mobile computing device.

In some aspects, the techniques described herein relate to a non-transitory computer-readable storage medium, wherein the operations further include: delivering the RCS message to the mobile computing device according to the scheduled delivery.

In some aspects, the techniques described herein relate to a non-transitory computer-readable storage medium, wherein the content includes a carousel of selectable options in a user interface of the mobile computing device, the selectable options including performing at least one secure transaction, scheduling an appointment, or resuming at least one abandoned user journey.

In some aspects, the techniques described herein relate to a non-transitory computer-readable storage medium, wherein the content is provided in the user interface and the user interface is within a browser executing on the mobile computing device.

In some aspects, the techniques described herein relate to a non-transitory computer-readable storage medium, wherein the content includes send and receive indicators provided in a user interface of the mobile computing device that indicate real time typing between an RCS message provider and the mobile computing device or between another computing device and the mobile computing device.

In some aspects, the techniques described herein relate to a non-transitory computer-readable storage medium, wherein the operations further include: determining a sender of the RCS message; responsive to failing to authorize the determined sender of the RCS message, delivering, according to the scheduled delivery, an SMS message indicating a warning about the RCS message.

In some aspects, the techniques described herein relate to a non-transitory computer-readable storage medium, wherein the at least one link associated with the content includes one or more options to: perform a transaction, select a suggested response, return to a prior browsing session, or return to a prior application session.

The details of one or more implementations are set forth in the accompanying drawings and the description below. Other features will be apparent from the description and drawings, and from the claims.

Figure 1:
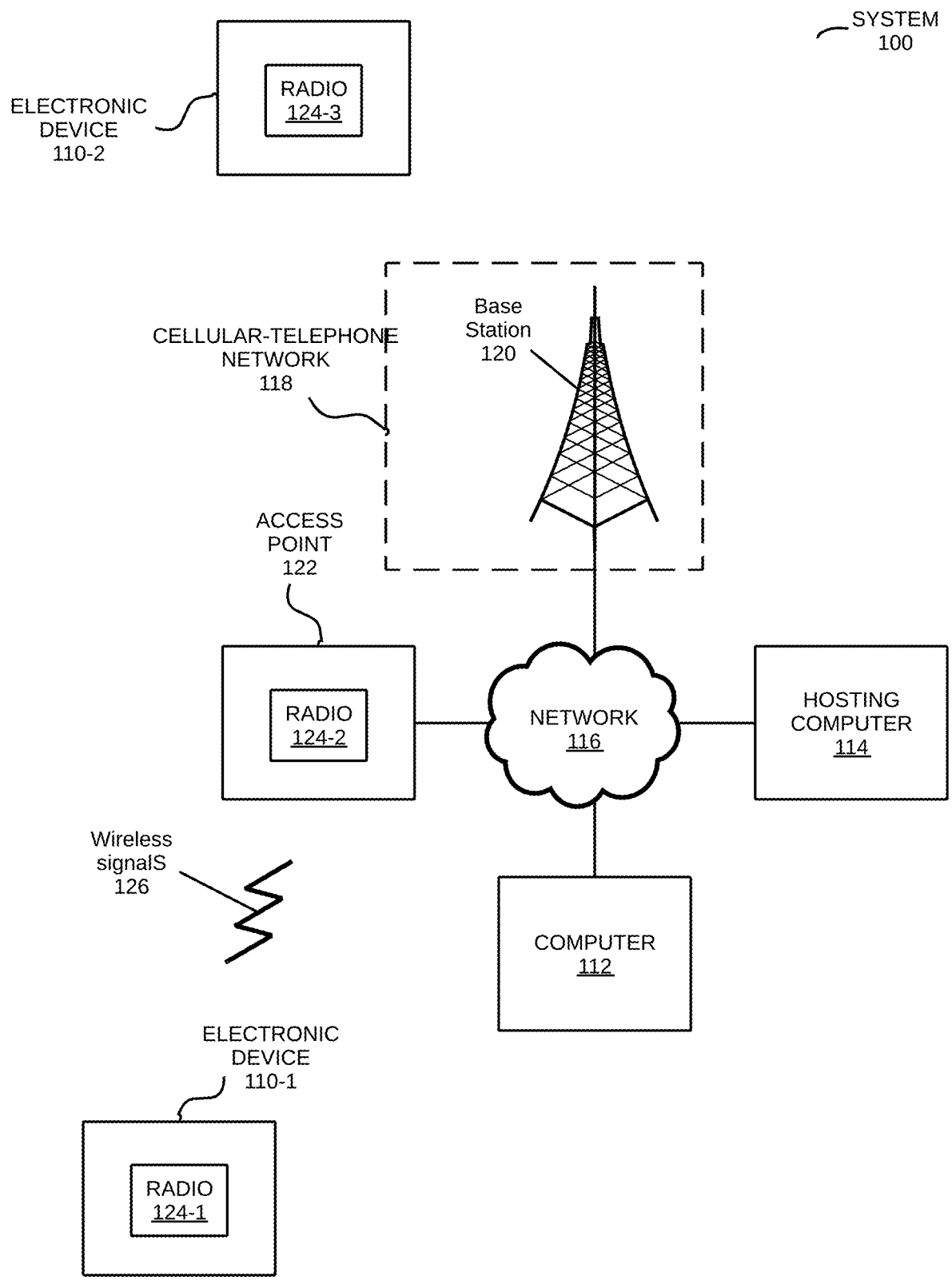
FIG. 1 is a block diagram illustrating an example of a system with electronic devices wirelessly communicating in accordance with an embodiment of the present disclosure.

The illustrated implementations are merely examples and are not intended to limit the disclosure. The schematics are drawn to illustrate features and concepts and are not necessarily drawn to scale

DETAILED DESCRIPTION

Disclosed herein are systems and methods for employing multi-stage access and security mechanisms for mobile devices. The systems and methods may function to generate, provide, and manage messages and links to a user on a mobile and/or cellular computing device. In sending such messages and links, the systems and methods may utilize Rich Communication Services (RCS), Silent Network Authentication (SNA) techniques, biometric analysis techniques, device hardware components (e.g., Subscriber Identity Modules (SIM) cards or other smart card and/or sensors), and automated messaging techniques to provide users with secure access to content as well as secure purchasing capabilities. Additional techniques for utilizing such security with a previously abandoned shopping cart are also described.

In operation, the techniques described herein may utilize an Automated Messaging Distribution Array (AMDA) system. The AMDA system may represent an integration of various technologies described herein aimed at optimizing and personalizing messaging campaigns across multiple communication channels such as Short Message Service (SMS), Multimedia Message Service (MMS), RCS, and Over-the-Top (OTT) platforms. The AMDA system may leverage Machine Learning (ML) and/or Artificial Intelligence (AI) techniques to analyze subscriber data, automate decision-making processes, and deliver targeted and secure content to users based on individual preferences and behaviors. For example, the AMDA system may utilize an AI/ML framework to parse extensive subscriber data and derive actionable insights. This may include classifying subscribers into different tiers based on subscriber engagement levels and predicting convenient or targeted messaging times and content preferences for subscribers while accounting for SMS, MMS, Federal Communications Commission (FCC), and Telephone Consumer Protection Act (TCPA) regulations associated with contacting consumers. The AI techniques used herein may enable dynamic and responsive campaign management that adapts to real time feedback and changes in subscriber behavior.

The AMDA systems described herein may provide an advantage of enhancing the effectiveness and efficiency of messaging campaigns by providing improvements over conventional messaging systems in terms of security, user engagement, and operational scalability. For example, the AMDA system may provide improvements in the field of automated messaging and communication technology, as described elsewhere herein.

The AMDA systems described herein may utilize an integrated multichannel communication methodology to seamlessly integrate various messaging formats and channels into a single, unified system. This capability allows businesses to manage diverse communication strategies through a central dashboard, for example, thereby enhancing the efficiency and coherence of messaging campaigns. The AMDA systems may provide advancement over conventional, siloed communication tools by using AI-insights to manage and optimize the use of different communication channels.

The techniques described herein may utilize Security and Authentication Protocols such as a Silent Network Authentication Protocol (e.g., SNA or SNAP). SNAP may provide a security framework within the AMDA system that ensures that communications and accesses performed on the system are securely managed through encryption and authentication mechanisms. SNAP's ability to provide secure, seamless authentication and data protection without compromising the user experience allows for security to occur for subscribers without burdening subscribers with conventional security protocols such as two-factor authentication using keywords, PIN codes, etc. However, the systems described herein may allow for a user to instead utilize conventional security protocols in the event that a device, transaction, or subscriber is not configured to support SNAP.

A technical problem solved by the systems and methods described herein includes determining how and when to present content, messages, opportunities, user journeys, user journey resumption to a user or subscriber of a messaging service, an app, an application, a browser, or other online or offline accessible data.

The systems and methods described herein provide a technical solution to the technical problem. The technical solution may include generating messages and interactive user interfaces within such messages that are customized to a user (e.g., subscriber, service subscriber, application user, browser user, authorized recipient, etc.) and sent to the user according to a schedule determined based on user behavior, determined convenience, and/or user preferences while maintaining messaging protocols for messaging laws including, but not limited to SMS/MMS/RCS messaging guidelines, Federal Communications Commission (FCC) regulations, and Telephone Consumer Protection Act (TCPA) regulations associated with contacting consumers.

The technical solutions provided by the systems and methods described herein are an improvement over conventional security and messaging systems because each message is customized for each user with customized content determined to be relevant to the particular user. Customized text, rich media (e.g., images, videos, audio messages), and/or interactive elements (e.g., links, carousels, quick reply user interface elements, actions, or other actionable interactive content etc.), read receipts, and/or typing indicators may be included in the customized messages. By contrast, conventional text and/or RCS messaging systems may include customized addresses or name salutations, but do not customize multiple items representing specific interactive content in the messages based on prior user behavior such as browsing, shopping, abandonment of activities, form completions, search journeys, or other user journeys performed in an application or browser. For example, the systems and methods described herein may provide a solution that includes an RCS message that may include any combination of customized text and images, rich media (e.g., images, videos, audio messages), and/or interactive elements (e.g., links, carousels, quick reply user interface elements, actions, or other actionable interactive content etc.), read receipts, and/or typing indicators, each of which may benefit from the utilization of the SNAP security protocol in such a manner that the content to be accessed triggers approval by silent authentication prior to access being granted. Another example could be related to a product, event, e-commerce opportunity, etc. purchase process being accessed within the RCS message itself, whereby the silent authentication may be utilized to run the verification checks that validate the purchaser credentials and enable the transaction to be completed.

A computer that dynamically generates a customized second document is described. During operation, the computer receives information specifying activation of a hosted field in a document associated with a third party (or potential client), where the information specifies a willingness to receive one or more messages from the computer and specifies a telephone number. In response, the computer dynamically generates a customized second document that includes information about one or more transactions (such as one or more upcoming events) of interest to an individual (or potential subscriber customer) associated with the telephone number. Then, the computer sends a message to an address corresponding to the telephone number, where the message includes a link to the customized second document. Next, when the computer receives information specifying activation of the link from an electronic device, the computer provides information specifying the customized second document to the electronic device for display on the electronic device.

By providing the dynamically generated customized second document, this communication technique facilitates secure performance of a given transaction in the one or more transactions. Moreover, the dynamically generated customized second document may include customized content that is relevant to the individual (or potential subscriber customer). This may allow the individual (or potential subscriber customer) to directly access information that is of interest to them. Consequently, the communication technique may simplify the user experience, thereby increasing the likelihood that the individual (or potential subscriber customer) conducts the given transaction. In the process, the communication technique may increase satisfaction of the individual (or potential subscriber customer) and an entity associated with the one or more transactions, such as an event organizer (or potential client).

In the discussion that follows, electronic devices and computers may include radios or, more generally, network interfaces that communicate packets or frames in accordance with one or more communication protocols, such as: an Institute of Electrical and Electronics Engineers (IEEE) 802.11 standard (which is sometimes referred to as 'Wi-Fi®,' from the Wi-Fi® Alliance of Austin, Texas), Bluetooth™ (from the Bluetooth Special Interest Group of Kirkland, Washington), a cellular-telephone communication protocol, another type of wireless interface, a wired network communication protocol (e.g., Ethernet, Ethernet II or an IEEE 802.3 standard, which are individually or collectively henceforth referred to as 'Ethernet') and/or another network communication protocol. For example, the cellular-telephone communication protocol may include or may be compatible with: a second generation or mobile telecommunication technology, a third generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used. In addition, the communication may occur via a wide variety of frequency bands. In the discussion that follows, Ethernet (which is sometimes referred to as a 'non-wireless communication technique' or protocol) is used as an illustrative example.

Communication among electronic devices is shown in FIG. 1, which presents a block diagram illustrating an example of a system 100 that includes electronic devices 110 (such as a computer, a portable electronic device, a cellular telephone, a tablet computer, a smartwatch, a wearable device, etc.), computer 112 (such as a cloud-based computer or server), and hosting computer 114 that communicate with each other using wired (or non-wireless communication) via network 116 (such as the Internet) and/or optional wireless communication via a cellular-telephone network 118 (e.g., via an optional base station 120), a wireless local area network (e.g., via an optional access point 122) and/or a another wireless communication technique. Note that the optional access point 122 may provide access to network 116, such as the Internet, via an Ethernet protocol, and may be a physical access point or a virtual or 'software' access point that is implemented on a computer or an electronic device.

As described further below with reference to FIGS. 2-3, computer 112 may inject a hosted field into a document provided by hosting computer 114. For example, computer 112 may provide, via network 116, the hosted field for inclusion in a webpage associated with a third party (i.e., that is other than a provider of the communication technique), and that is provided, via network 116 and cellular-telephone network 118 (or the optional access point 122), by hosting computer to one of electronic devices 110 (such as electronic device 110-1). An application (such as a Web browser) executed in an environment of electronic device 110-1 (such as an operating system) may display the document. Note that the hosted field may allow a user of electronic device 110-1 (who is sometimes referred to as an 'individual') to indicate a willingness to receive one or more messages from computer 112 and that specifies a telephone number associated with electronic device 110-1. Such users may be called a subscriber customer.

When the user or subscriber customer activates the hosted field and provides the telephone number, electronic device 110-1 may provide, via network 116 and cellular-telephone network 118 (or the optional access point 122), information specifying activation of the hosted field in the document and the telephone number to hosting computer 114. In turn, hosting computer 114 may provide, via network 116, this information to computer 112.

After receiving the information specifying activation of the hosted field in the document, computer 112 may dynamically generate a customized second document (such as a webpage) that includes information about one or more transactions (such as one or more upcoming events) of interest to the individual or subscriber customer associated with the telephone number. Then, computer 112 may send a message to an address corresponding to the telephone number, where the message includes a link to the customized second document. For example, the message may be sent via network 116 and cellular-telephone network 118 (or the optional access point 122). Note that the message may include an SMS message (which is sometimes referred to as a 'text message').

Moreover, after receiving the message, electronic device 110-1 may display the message. If the individual or subscriber customer activates the link, electronic device 110-1 may provide, via network 116 and cellular-telephone network 118 (or the optional access point 122), information specifying activation of the link to computer 112.

When computer 112 receives information specifying activation of the link from electronic device 110-1, computer 112 may provide, via network 116 and cellular-telephone network 118 (or the optional access point 122), information specifying the customized second document to electronic device 110-1 for display on the electronic device (such as by the application executing on electronic device 110-1). Furthermore, as described further below, computer 112 may provide, via network 116 and cellular-telephone network 118 (or the optional access point 122), authentication information (such as an authentication cookie) to electronic device 110-1 to authenticate completion of a given transaction in the one or more transactions. Note that the authentication information may be valid for a predefined time interval, such as 1 day, a week, or a month. After this predefined time interval has elapsed, the authentication information may expire.

Additionally, the customized second document may allow completion of the given transaction in the one or more transactions, such as purchasing one or more tickets to an upcoming event. For example, the individual or subscriber customer may interact with the customized second document to provide, via network 116 and cellular-telephone network 118 (or the optional access point 122), to exchange information with computer 112 to complete the transaction. As noted previously, a purchase request received from electronic device 110-1 and associated with the customized second document may be rejected by computer 112 if the authentication information is not stored on electronic device 110-1.

In some embodiments, after receiving the information specifying activation of the hosted field, computer 112 may confirm that the telephone number is included in a data structure (such as a data structure with information about subscribers to a transaction service) prior to dynamically generating the customized webpage. For example, the one or more transactions of interest to the individual or subscriber customer may be associated with an entity (such as an event organizer also referred to herein as a client of the system), and the individual or subscriber may have a subscription with the entity or client. If the telephone number is included in the data structure, computer 112 may proceed and dynamically generate the customized second document. Otherwise, computer 112 may communicate, via network 116 and cellular-telephone network 118 (or the optional access point 122), with electronic device 110-1 to confirm that the individual or subscriber customer wants to receive the one or more messages prior to dynamically generating the customized second document.

Moreover, the individual or subscriber customer may use electronic device 110-1 to request a dynamically generated customized third document. For example, electronic device 110-1 may provide, via network 116 and cellular-telephone network 118 (or the optional access point 122), a request message with a predefined code (such as an alphanumeric code) addressed to a second address corresponding to a second telephone number associated with computer 112. In response, computer 112 may dynamically generate the customized third document that includes information about one or more additional transactions of interest to the individual or subscriber customer associated with the telephone number. Then, computer 112 may provide, via network 116 and cellular-telephone network 118 (or the optional access point 122), another message addressed to the address corresponding to the telephone number, where the other message includes a link to the customized third document.

In these ways, the communication techniques may be used to facilitate the conducting of one or more transactions in a secure manner. Moreover, because an instance of the dynamically generated customized document is tailored, at a particular time, to the specific interests of the individual or subscriber customer, the content included in the instance of the customized document may be more relevant to the individual or subscriber customer and immediately actionable (without, e.g., requiring that the individual navigate to content that may be of interest to them). This capability may enhance the user experience of the individual or subscriber customer and may encourage the individual or subscriber customer to perform one or more transactions. The communication technique may enable a customer capture rate of greater than 10%, 15%, 20%, 25%, or 30%. For example, the customer capture rate may be 14.5%.

As noted previously, in some embodiments, communication among components in system 100 involves wireless communication. During the wireless communication, electronic devices 110, the optional base station 120 and/or the optional access point 122 may: transmit advertising frames on wireless channels, detect one another by scanning wireless channels, establish wireless connections (for example, by transmitting association requests), and/or transmit and receive packets or frames (which may include the association requests and/or additional information as payloads). Moreover, during the wired communication, electronic devices 110, computer 112, and/or the hosting computer 114 may receive packets or frames using a wired communication technique or protocol (e.g., Ethernet II or an IEEE 802.3 standard). In some embodiments, the optional base station 120 and/or the optional access point 122 may convert packets or frames that are received using the wired communication technique to a WLAN communication technique or protocol (such as an IEEE 802.11 standard or an LTE standard), and may wirelessly transmit the packets or frames. Similarly, the optional base station 120 and/or the optional access point 122 may: receive packets or frames using the WLAN communication technique; convert the packets or frames to the wired communication technique; and transmit the packets or frames. Thus, the optional base station 118 and/or the optional access point 122 may perform the functions of an access point.

As described further below with reference to FIG. 8, electronic devices 110, computer 112, hosting computer 114, the optional base station 120 and/or the optional access point 122 may include subsystems, such as: a networking subsystem, a memory subsystem and a processor subsystem. In addition, electronic devices 110, computer 112, hosting computer 114, the optional base station 120 and/or the optional access point 122 may include radios 124 in the networking subsystems. (Note that radios 124 may be instances of the same radio or may be different from each other.) More generally, electronic devices 110, computer 112, hosting computer 114, the optional base station 120 and/or the optional access point 122 can include (or can be included within) any electronic devices with the networking subsystems that enable electronic devices 110, computer 112, hosting computer 114, the optional base station 120 and/or the optional access point 122 to communicate with each other using wired communication (e.g., a non-wireless communication technique) and/or optional wireless communication. The optional wireless communication can comprise transmitting advertisements on wireless channels to enable electronic devices to make initial contact or detect each other, followed by exchanging subsequent data/management frames (such as association requests and responses) to establish a wireless connection, configure security options (e.g., Internet Protocol Security), and transmit and receive packets or frames via the wireless connection, etc.

As can be seen in FIG. 1, wireless signals 126 (represented by a jagged line) are optionally transmitted from radio 124-1 in electronic device 110-1. These wireless signals are optionally received by at least the optional access point 122. Notably, electronic device 110-1 may optionally transmit packets. In turn, these packets may be optionally received by a radio 124-2 in the optional access point 122. This may allow electronic device 110-1 to wirelessly communicate information to the optional access point 122. While FIG. 1 illustrates electronic device 110-1 transmitting packets, note that electronic device 110-1 may also receive packets from the optional access point 122.

In the described embodiments, processing of a packet or frame in electronic devices 110, the optional base station 120 and/or the optional access point 122 includes: receiving signals (such as wireless signals 126) with the packet or frame; decoding/extracting the packet or frame from the received signals to acquire the packet or frame; and processing the packet or frame to determine information contained in the packet or frame.

Note that the communication among electronic devices 110, computer 112, the hosting computer 114, the optional base station 120 and/or the optional access point 122 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization').

In these ways, the communication techniques may provide an efficient and secure way for the individual to receive relevant content and to conduct one or more transactions.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While electronic devices 110 and optional access point 122 are illustrated with a single instance of radios 124, in other embodiments, electronic devices 110, optional access point 120 and/or another component in system 100 may include multiple radios.

Figure 2:
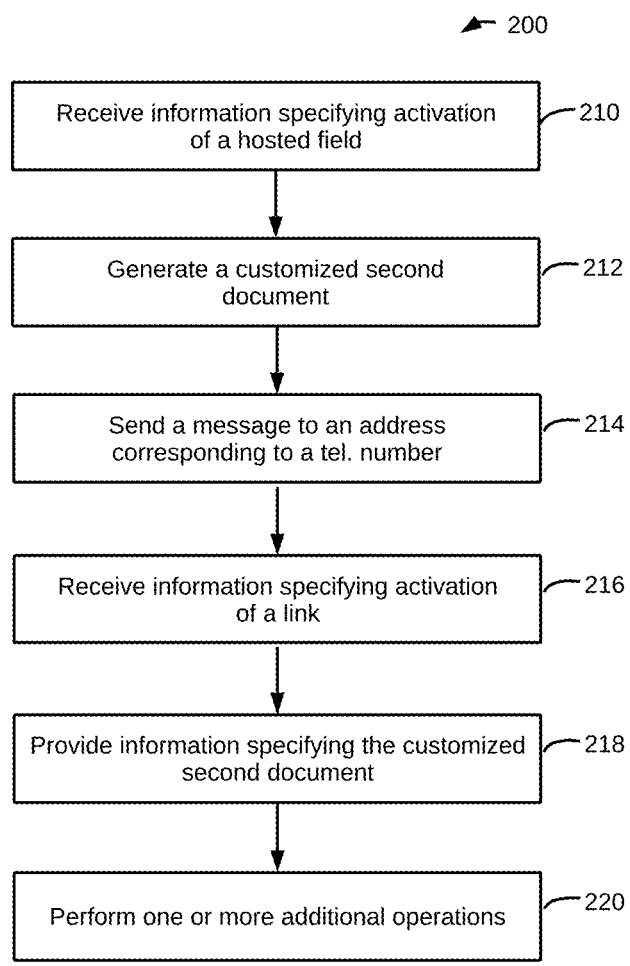
FIG. 2 is a flow diagram illustrating an example method for dynamically generating a customized document in accordance with an embodiment of the present disclosure.

FIG. 2 presents a flow diagram illustrating example method 200 for dynamically generating a customized document, which may be performed by a computer (such as computer 112 in FIG. 1). During operation, the computer may receive information (operation 210) specifying activation of a hosted field in a document associated with a third party or client, where the information specifies a willingness to receive one or more messages from the computer and specifies a telephone number. Note that the document may be a third-party or client webpage.

In response, the computer may dynamically generate a customized second document (operation 212) that includes information about one or more transactions (such as one or more upcoming events) of interest to an individual or subscriber customer associated with the telephone number. Notably, the customized second document may include a webpage. In some embodiments, the one or more transactions of interest to the individual or subscriber customer may be associated with an entity (such as an event organizer), and the individual or subscriber customer may have a subscription with the entity.

Then, the computer may send a message (operation 214) to an address corresponding to the telephone number, where the message includes a link to the customized second document. For example, the message may include an SMS message.

Next, when the computer receives information (operation 216) specifying activation of the link from an electronic device, the computer may provide information (operation 218) specifying the customized second document to the electronic device for display on the electronic device.

In some embodiments, the computer optionally performs one or more additional operations (operation 220). For example, the customized second document may allow completion of a given transaction in the one or more transactions, such as purchasing one or more tickets to an upcoming event. Consequently, the computer may selectively exchange information with the electronic device to perform the given transaction.

Moreover, the computer may provide authentication information (such as an authentication cookie) to the electronic device to authenticate purchases. For example, a purchase request received by the computer from the electronic device and associated with the customized second document may be rejected if the computer does not receive information that indicates that the authentication information is stored on the electronic device. Note that the authentication information may be valid for a predefined time interval. After this predefined time interval has elapsed, the authentication information may expire.

Furthermore, after receiving the information specifying activation of the hosted field (operation 210), the computer may confirm that the telephone number is included in a data structure prior to dynamically generating the customized webpage. If the telephone number is included in the data structure, the computer may proceed and dynamically generate the customized second document. Otherwise, the computer may confirm that the individual or subscriber customer wants to receive the one or more messages prior to dynamically generating the customized second document.

Additionally, when the computer receives a request message with a predefined code addressed to a second address corresponding to a second telephone number associated with the computer, the computer may dynamically generate a customized third document that includes information about one or more additional transactions of interest to the individual or subscriber customer associated with the telephone number. Then, the computer may provide a second message addressed to the address corresponding to the telephone number, where the second message includes a link to the customized third document. Note that the code may include an alphanumeric value.

In some embodiments of method 200, there may be additional or fewer operations. Moreover, there may be different operations. Furthermore, the order of the operations may be changed, and/or two or more operations may be combined into a single operation or performed at least partially in parallel.

Figure 3:
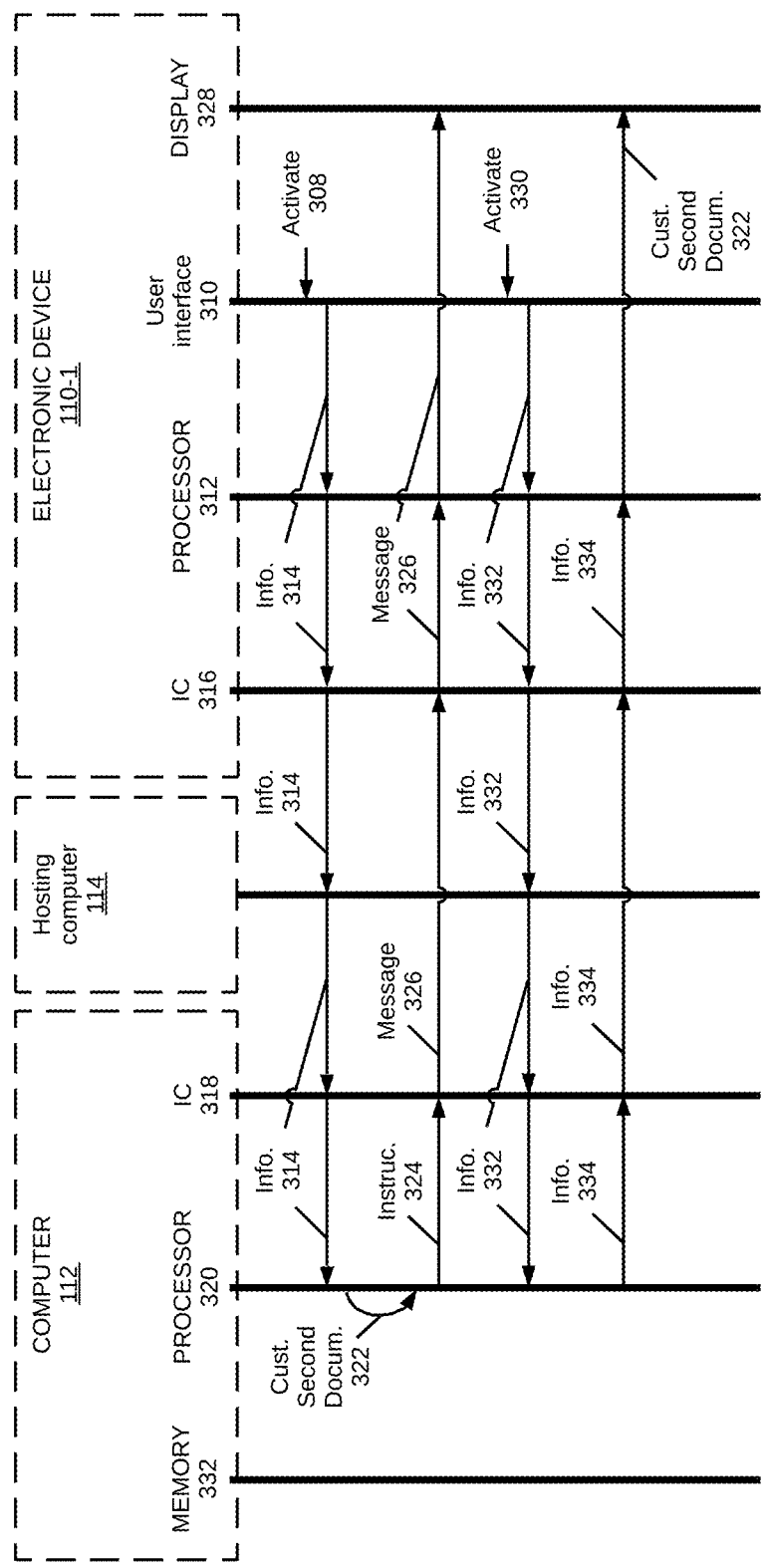
FIG. 3 is a drawing illustrating example communication among the electronic devices in FIG. 1 in accordance with an embodiment of the present disclosure.

FIG. 3 presents a drawing illustrating example communication between computer 112, hosting computer 114, and electronic device 110-1. During the communication, an interface circuit 316 in electronic device 110-1 may provide information 314 specifying activation of the hosted field in the document. For example, a user of electronic device 110-1 (such as an individual) may use a user-interface device 310 (such as a keyboard, a mouse, a touchpad, a touch-sensitive display, a voice interface, etc.) to activate 308 the hosted field in a webpage of the third party or client. Then, a processor 312 in electronic device 110-1 may provide information 314 to interface circuit 316 with an instruction or a command to communicate it to hosting computer 114.

After receiving information 314, hosting computer 114 may provide it to computer 112. Then, after receiving information 314, an interface circuit 318 in computer 112 may provide it to processor 320 in computer 112. In response, processor 320 may dynamically generate a customized second document 322 (such as a customized second webpage) that includes information about one or more transactions of interest to the individual or subscriber customer.

Furthermore, processor 322 may instruct 324 interface circuit 318 to send a message 326 (such as an SMS message) to an address corresponding to the telephone number, where the message includes a link to the customized second document.

This message may be received by interface circuit 316, which may forward it to processor 312 for display on a display 328 in electronic device 110-1. Next, the individual or subscriber customer may use user-interface device 310 to activate 330 the link. When this occurs, processor 312 may provide information 332 to interface circuit 316 with an instruction or a command to communicate it to computer 112.

When interface circuit 318 receives information 332 specifying activation of the link, interface circuit 318 may provide it to processor 320. In response, processor 320 may provide information 334 specifying the customized second document 322 to interface circuit 318. In response, interface circuit 318 may provide information 334 to electronic device 110-1.

After receiving information 334, interface circuit 316 may provide it to processor 312, which displays customized second document 322 on display 328. While FIG. 3 illustrates operations with single or double-sided arrows corresponding, respectively, to unilateral or bilateral communication, in general a given operation in these drawings may involve unilateral or bilateral communication. Note that the communication between components in FIG. 3 may involve communication of one or more packets or frames.

Moreover, while the preceding discussion illustrates communication of the information specifying activation of the hosted field to computer 112 via hosting computer 114, in other embodiments, electronic device 110-1 communicates this information directly to computer 112.

Furthermore, while SMS messaging was used in the preceding discussion, different communication channels may be used in other embodiments, e.g., email, Enhanced Messaging Service (EMS), and/or MMS.

We now describe embodiments of the communication technique. In these embodiments, a 'client' may be a third-party ticket provider or any third-party service or event provider.

Note that the communication technique may not simply provide a marketing channel for pre-existing content. Instead, the customized webpage (or website) may be created de novo for each subscriber customer or individual. A given subscriber customer cannot hit their webpage without a specific link that is provided to the given subscriber customer. Because the webpage does not exist before the link is created and provided to the given subscriber customer, there may not be another way to access the customized webpage. If the link for the customized second document is shared with a second individual, the second individual may browse content customized for the first individual but will be prohibited from accessing a profile of the first individual and/or executing a transaction unless the second individual subscribers and provides his/her telephone number. In such a scenario, the 3P message service sends a new link to the second individual that is customized to the second individual, the new link being customized to the second individual. The customized webpage may be curated for the given subscriber customer (e.g., based on a specific industry, events, organizer, etc.). Moreover, the customized webpage may be updated based on user habits, history, preferences, information from third-party application programming interfaces (APIs), etc. The customized webpage may pull in or incorporate additional events that may be of interest to the given subscriber customer. In addition, the communication technique may provide controls and distribute payments. For example, computer 112 (FIG. 1) may create a link that is associated with its own webpage and that can be used to create or conduct a given transaction.

In some embodiments, if the link for the customized second document may be shared with a second individual, the second individual may browse content customized for the first individual but will be prohibited from accessing a profile of the first individual and/or executing a transaction unless the second individual also has access credentials. If the second individual has access credentials, the link may be accessed and a transaction may be executed using account details, login details, and/or security details associated with the second individual. In such a scenario, the 3P message service can additionally send a new link to the second individual that is customized to the second individual to allow the second individual to execute a transaction (e.g., make one or more purchases, trigger sending of links or messages, etc.).

In the communication technique, an Amplify Decision Delivery Processor (ADDP) may use a data structure to match, update orders, parse down information, compile links (such as HTML links), and/or provide authorization and financial information.

In some embodiments, when a client (e.g., electronic device 110-1, electronic device 110-2, computer 112, etc.) encounters the communication technique, e.g., in an application, a continuous subscriber capture (CSC) input may be injected as an input into a purchase form. Moreover, when a client installs the application, computer 112 (FIG. 1) may have access to information and, thus, the ability to sell a wide variety of their inventory.

Subsequently, when the given subscriber customer encounters a CSC input (and, more generally, a hosted field) in a webpage associated with a client, they may select a box that indicates 'yes' they would like to receive text messages. This 'yes' input may be provided to the ADDP, which may check whether a telephone number of the given subscriber customer is included in the data structure.

If their telephone number is in the data structure, the ADDP may send a text message to the given subscriber customer with a link to the customized document showing events of interest. Note that if an event organizer or client has one event, the customized document or webpage may only show one event. However, if the event organizer or client has many events, the customized document or webpage may show or include multiple events.

Alternatively, if the given subscriber customer's telephone number is not in the data structure, the ADDP may send a text message to the given subscriber customer to confirm that they want to receive text messages.

Furthermore, one or more vaults with financial information may be copied for future payments when the given subscriber customer conducts a transaction via their customized webpage.

Additionally, the ADDP may create a 'hot' cookie that goes onto the given subscriber customer's electronic device (e.g., cellular telephone) for future payments. This cookie may expire, e.g., after 30 days. If the subscriber customer attempts to use the cookie for a future payment but the cookie expired, the subscriber customer may verify their telephone number via an alphanumeric value sent to their telephone number to reactivate the cookie (make it 'hot' again).

Note that the given subscriber customer can also access their user profile via the link in the text message.

In some embodiments, the given subscriber customer can, at any time, get or receive a text message with a link to a customized webpage with events and/or user preferences by sending a text message with, e.g., a 5-digit short code to a telephone number associated with the ADDP. For example, the short code may be: an organizer name and/or a name of a provider of the communication technique (such as 'Amplify').

The communication technique may address security flaws in existing approaches (such as SIM-case swapping or fraudulent use of a link, etc.). Notably, these problems may be addressed by the use of the 'hot' cookie stored on the given subscriber customer's cellular telephone, because a fraudulent user that does not have the 'hot' cookie will not be able to access transaction information in the customized webpage or conduct a transaction when they activate the link. Thus, the 'hot' cookie may make it very difficult to game the communication technique. In order to thwart SIM swapping, in some embodiments, the communication technique may include a biometric authentication operation, such as facial recognition or recognition of another biometric marker (e.g., fingerprint recognition).

Furthermore, the ADDP may conduct reviews to verify/validate subscriber customers and their information. For example, the ADDP may review subscriber customer subscriptions (such as the event organizers or client to which a given subscriber customer has subscriptions), customer telephone numbers, etc.

Figure 4:
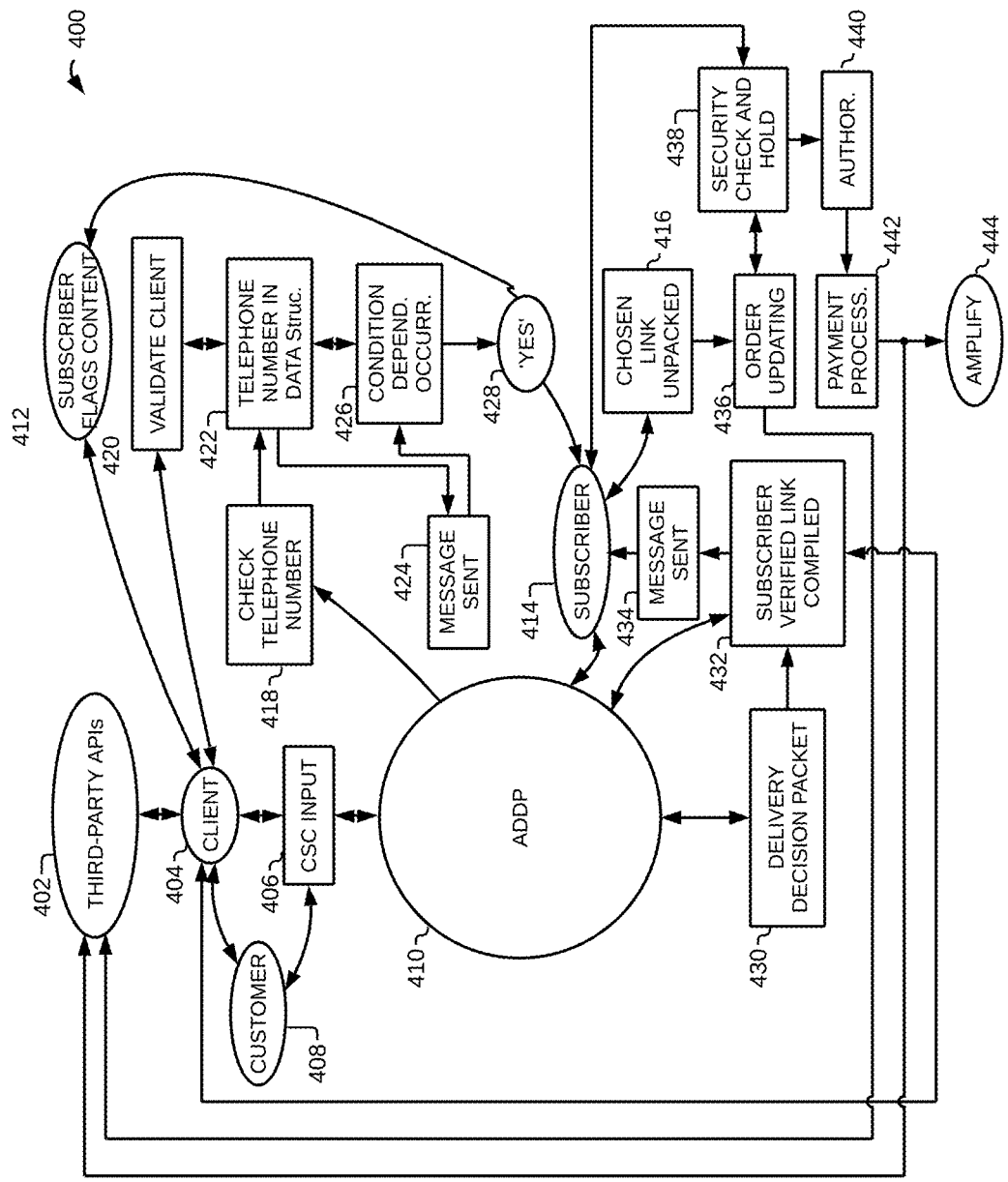
FIG. 4 is a drawing illustrating an example of a continuous subscriber flow in accordance with an embodiment of the present disclosure.
Figure 5:
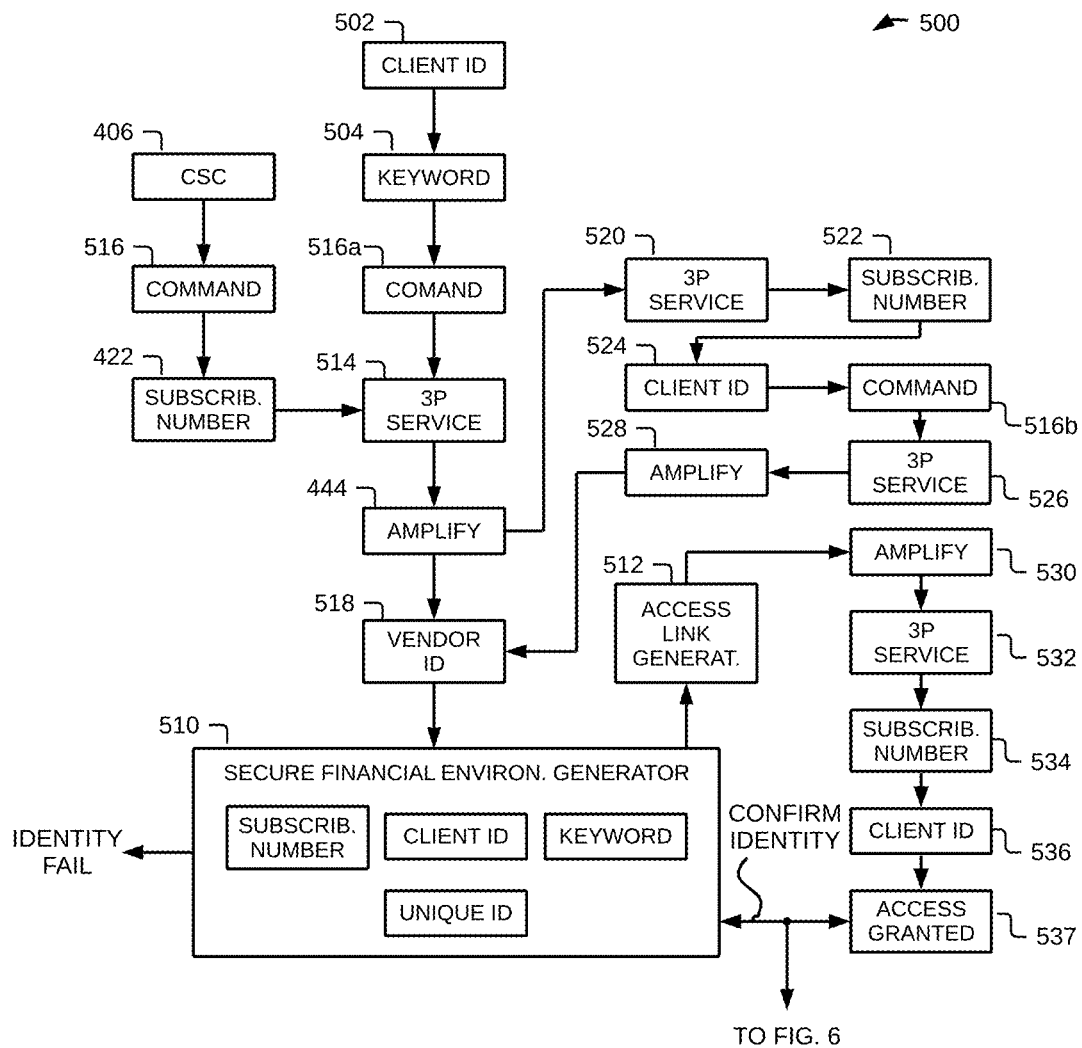
FIG. 5 is a drawing illustrating an example of a secured environment generator in accordance with an embodiment of the present disclosure.
Figure 6:
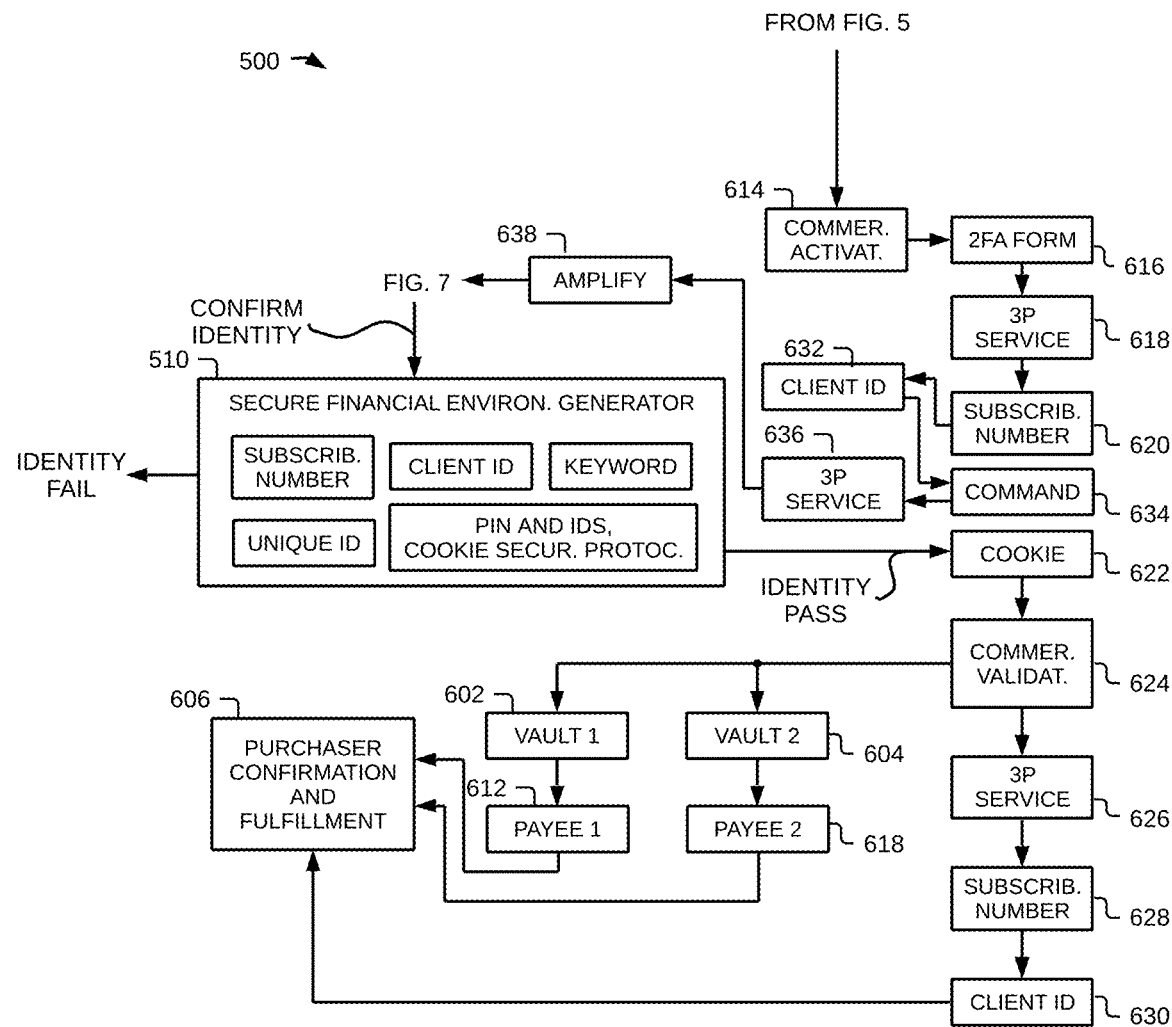
FIG. 6 is a drawing illustrating an example of the secured environment generator of FIG. 5 in accordance with an embodiment of the present disclosure.
Figure 7:
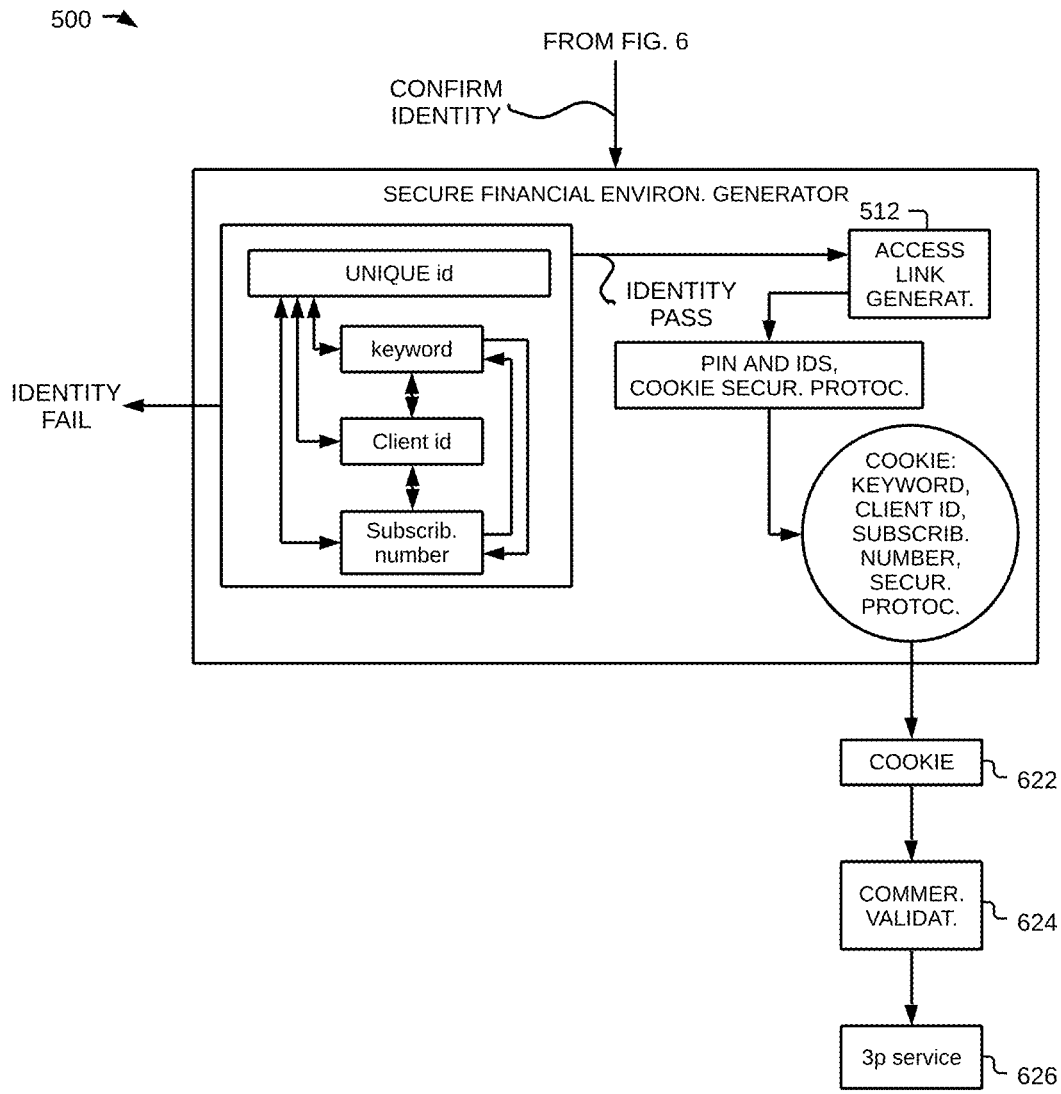
FIG. 7 is a drawing illustrating an example of the secured environment generator of FIG. 5 in accordance with an embodiment of the present disclosure.

FIG. 4 presents a drawing illustrating an example of a continuous subscriber customer flow 400, and FIGS. 5-7 presents drawings illustrating an example of a secured environment generator 500. In some embodiments, the communication technique (which is sometimes referred to as 'Amplify') may be implemented in conjunction with a third-party API 402. Notably, a custom integration implementation of Amplify 444 may be provided to the third-party API 402. This may involve access to Amplify 444 being made available inside the third-party API 402 platform to a client (such as an event organizer) that installs a software implementation of Amplify 444. Alternatively or additionally, the client 404 may allow Amplify 444 to access their client platform. For example, the client 404 may provide access codes that enable the client to pass an identifier of their third-party API platform to ADDP 410. As shown in FIG. 5, this may enable the client to create a client keyword 504 (such as an organizer word or short code) that can be texted (command 516*a*) to a telephone number associated with the ADDP 410 (or computer 112 of FIG. 1) in ADDP 410, which may result in the client becoming an ADDP client. As an ADDP client, the client may gain access to the ADDP text messaging capability via an Amplify 444 provider 3P messaging service 514. Inventory, events, etc. associated with each client are associated with a vendor ID 518.

As shown in FIGS. 4-5, as a result of becoming an ADDP client, ADDP 410 may inject a CSC input 406 into client web-purchase forms generated by the third-party API platform 402. This may enable the client 404 to allow their subscriber customers 408 to trigger the CSC input 406 to command 516 ADDP 410 to commence subscriber customer capture as an Amplify subscriber via a cellular telephone number 422 (which is sometimes referred to as a 'subscriber number') input by a subscriber customer 408 in client web-purchase forms generated by the third-party API 402.

ADDP 410 may flag a subscriber customer identifier (ID) 412 to the third-party API platform 402 for future reference and action. For example, ADDP may trigger the 3P messaging service 446 to send a text message with a unique e-commerce micro-website (e.g., a UEMWEB) abstract link (which was generated by ADDP). This micro-website may include client ticket purchase opportunities for the subscriber customer.

When the subscriber customer 414 clicks or activates a UEMWEB link, the UEMWEB abstract unpacks 416 the client ticket purchase opportunities inside a Web browser on a cellular telephone of the subscriber customer. The UEMWEB may provide options to navigate through and choose to commence an e-commerce transaction.

As shown in FIG. 5, Amplify 444 may further send a message through the 3P messaging service 520 to a subscriber customer number 442 associated with a client ID 524. The message may include an actionable item, e.g., a link to purchase tickets or view a customized webpage, such that the subscriber customer can send a command 516*b* using the 3P service 526 to view the customized webpage or purchase tickets or etc. which is sent to Amplify 528 for fulfillment and payment services.

Note that ADDP 410 may be how the client 404, the customers 408 of the client that become an Amplify subscriber, and Amplify 444 relate to each other through a matrix of conditions, abstracts and ordering of decisions. For example, an input received from a CSC input 406 may contain the third-party API platform identifier and the subscriber customer telephone number. When the telephone number details are confirmed, they may become a subscriber customer in a data structure of ADDP 410 for future actions.

When checking the telephone number 418, the area code may be checked to geographically place and validate a location and area code of the telephone number to validate the subscriber customer 420 and verify that the subscriber customer is a customer of Amplify. Moreover, if the telephone number is a land line, it may be purged. However, if the telephone number is a cellular-telephone number, continue.

Then, whether the telephone number is in a data structure 422 may be checked to validate the subscriber customer 420. If yes, a check whether the customer is currently subscribed or unsubscribed to Amplify 444 for a current client may be performed. If yes 428, conditions are checked and acted upon. However, if no, an opt-in verification message may be sent 424. Note that conditional dependent occurrences 426 may include determining if an opt-in message 424 is needed.

When opt-in occurs, the customer becomes a subscriber 414. Notably, a subscriber customer 414 may be added to the Amplify data structure. Moreover, the subscriber customer 414 may be flagged to the client 412, and the client 404 thereafter may have access to the subscriber customer 414.

During content delivery matching, the organization's attributes may be checked, such as a type, industry, events, inventory, etc. Moreover, subscriber customer preferences may be checked via the third-party API and/or a data structure of preferences/history, etc. Then, the relevant event details are pulled through the third-party API for compiling of abstracts. Next, the relevant content to be compiled in a packet is decided 430, such as: which partner's events, which specific events, single event, events list, etc. This information may be curated via third-party API(s). Furthermore, when the subscriber customer verification is checked, a trackable link is compiled 432. Additionally, the message may be sent to the subscriber customer 434. When the subscriber customer interacts with the content, an order may be created and updated 436 accordingly in line with subscriber customer actions and available inventory in tandem with third-party API checks.

During an Amplify security check and hold 438, the subscriber customer may: navigate to UEMWEB, undertake choosing ticket purchase options, provide financial information (such as credit-card details) in a UEMWEB purchase form, and may activate a command to authorize 440 an e-commerce transaction. After ADDP receives a command, it may trigger the 3P messaging service to send a, e.g., 4-digit PIN code to subscriber customer via MMS/SMS. This PIN code may be input into a purchase form during authorization 440 to enable the subscriber customer to activate a command to commence a, e.g., credit-card charge. This may trigger payment processing 442.

During payment processing, a secured financial environment generator 500 may: require a client ID 502, a client keyword 504, a client third-party API platform identifier, and a subscriber customer telephone number 422 to interoperate in order to drive encryption (such as UIE encryption), which allows an e-commerce transaction to commence. When these operations are confirmed and compiled, the secured financial environment generator 500 may pass security checks, may provide authorization for the transaction to continue, and may place a packet containing UIE and PIN into a subscriber customer verified link 512.

Moreover, the secured financial environment generator 510 may generate a hot cookie that may include information specifying the keyword, client, subscriber customer, and protocol, and may place it and activate it in the purchase form, as shown in FIG. 6. The hot cookie is stored locally on the device of the subscriber customer for a defined period of time, as described elsewhere herein. Once the hot cookie is validated, an access link is generated 512 and sent through Amplify 530 to a subscriber customer number 534 associated with a client ID 536 using the 3P messaging service 532 to allow account access 536 to complete a purchase. Validation of the hot cookie confirms the identity of the client and further allows access 536 to complete a purchase.

Turning to FIGS. 6-7. Once access is granted in FIG. 5 information stored in the hot cookie allows commerce to be activated at 614. Information is input into a 2-factor authentication form (2FA Form) 616 sent via 3P messaging service 618 from subscriber customer number 620 associated with client ID 632. Once the form 616 is completed and transmitted at command 634 via 3P messaging service 636 through Amplify 638, the identity of the subscriber customer transmitting the form is confirmed through the secure financial environment generator 510. Once the identity is confirmed using the hot cookie 622, the commerce is validated at 624, which may allow financial information (such as credit-card charges) to process and pass authorization and processing.

This may trigger ADDP to deliver financial information (such as credit-card details) to Vault 1 602 as well as Vault 2 604 based on partnership requirements in certain payment abstract scenarios. Moreover, it may enable credit-card charges to be made and completed resulting in purchase confirmation and fulfillment 606. While this is occurring, a hold may be placed on the credit card (or another financial vehicle) of the subscriber customer.

Next, ADDP may trigger the 3P messaging service 626 to send a notification (such as an SMS message) to the subscriber customer number 628 associated with client ID 630 with a link to purchased tickets as a result of a purchase confirmation and fulfillment details 606.

Furthermore, ADDP may manage updating inventory of the client via the third-party API as a result of a purchase confirmation and fulfillment. ADDP may transfer credit-card charge receipts to one or more payees 610, 612, such as the client if they are the merchant of record. Alternatively, the third-party API may push the delivery payment receipt to the client if they are the merchant of record.

We now describe embodiments of an electronic device, which may perform the communication technique. FIG. 8 presents a block diagram of an example of an electronic device 800, such as one of: electronic devices 110, computer 112, hosting computer 114, optional base station 120 or optional access point 122. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, one or more GPUs, and/or one or more digital signal processors (DSPs).

Memory subsystem 812 includes one or more devices for storing data and/or instructions for processing subsystem 810 and networking subsystem 814. For example, memory subsystem 812 can include dynamic random-access memory (DRAM), static random-access memory (SRAM), a read-only memory (ROM), flash memory, and/or other types of memory. In some embodiments, instructions for processing subsystem 810 in memory subsystem 812 include: one or more program modules or sets of instructions (such as program instructions 822 or operating system 824), which may be executed by processing subsystem 810. For example, a ROM can store programs, utilities or processes to be executed in a non-volatile manner. Further, for example, DRAM can provide volatile data storage and may store instructions related to the operation of electronic device 800. Note that the one or more computer programs may constitute a computer-program mechanism, a computer-readable storage medium, or software. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810. In some embodiments, the one or more computer programs are distributed over a network-coupled computer system so that the one or more computer programs are stored and executed in a distributed manner.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Figure 8:
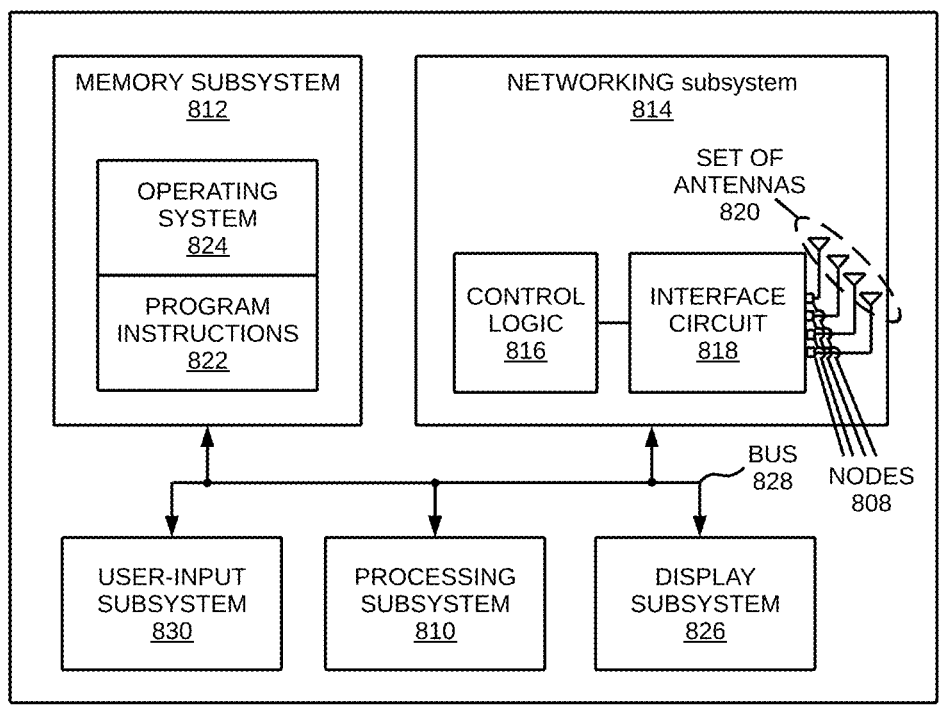
FIG. 8 is a block diagram illustrating an example of one of the electronic devices of FIG. 1 in accordance with an embodiment of the present disclosure.

Networking subsystem 814 includes one or more devices configured to couple to and communicate on a wired and/or wireless network (i.e., to perform network operations), including: control logic 816, an interface circuit 818 and a set of antennas 820 (or antenna elements) in an adaptive array that can be selectively turned on and/or off by control logic 816 to create a variety of optional antenna patterns or 'beam patterns.' (While FIG. 8 includes set of antennas 820, in some embodiments electronic device 800 includes one or more nodes, such as nodes 808, e.g., a pad, which can be coupled to set of antennas 820. Thus, electronic device 800 may or may not include set of antennas 820.) For example, networking subsystem 814 can include a Bluetooth networking system, a cellular networking system (e.g., a 3G/4G/5G network such as UMTS, LTE, etc.), a universal serial bus (USB) networking system, a networking system based on the standards described in IEEE 802.9 (e.g., a Wi-Fi networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices.

Within electronic device 800, processing subsystem 810, memory subsystem 812, and networking subsystem 814 are coupled together using bus 828 that facilitates data transfer between these components. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc. Display subsystem 826 may be controlled by processing subsystem 810 to display information to a user.

Electronic device 800 can also include a user-input subsystem 830 that allows a user of the electronic device 800 to interact with electronic device 800. For example, user-input subsystem 830 can take a variety of forms, such as: a button, keypad, dial, touch screen, audio input interface, etc.

Electronic device 800 can be (or can be included in) any electronic device with at least one network interface. For example, electronic device 800 may include: a cellular telephone or a smartphone, a smartwatch, a wearable device, a tablet computer, a laptop computer, a notebook computer, a personal or desktop computer, a netbook computer, a media player device, an electronic book device, a smartwatch, a wearable computing device, a portable computing device, a consumer-electronic device, as well as any other type of electronic computing device having wireless communication capability that can include communication via one or more wireless communication protocols.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems.

Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program instructions 822 are included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814. This integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 822, operating system 824 (such as a driver for interface circuit 818) or in firmware in interface circuit 818. Alternatively or additionally, at least some of the operations in the communication technique may be implemented in a physical layer, such as hardware in interface circuit 818.

Silent Network Authentication

Figure 9:
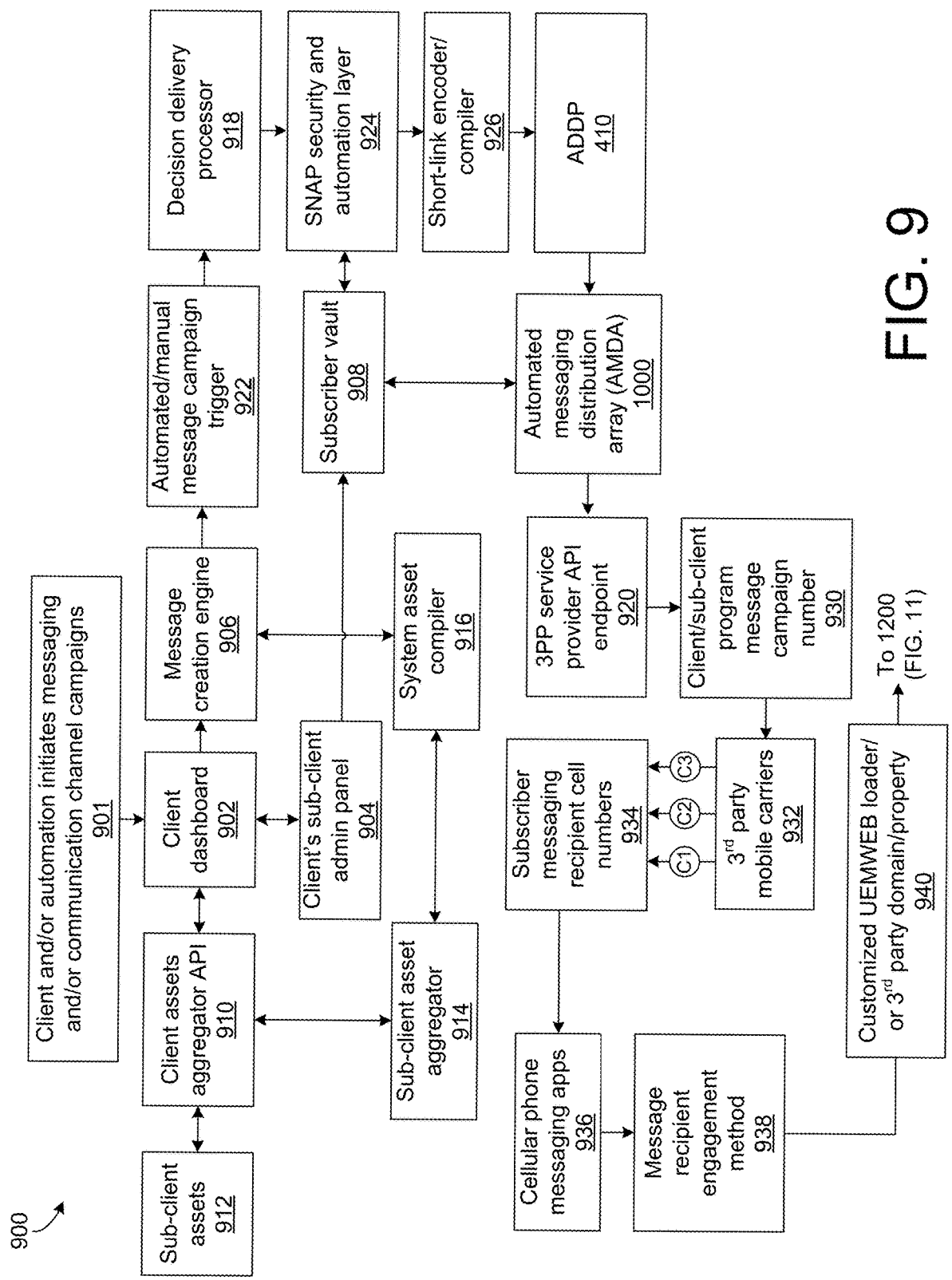
FIG. 9 is a drawing illustrating an example of an automated silent network authentication security and access control system in accordance with an embodiment of the present disclosure.

FIG. 9 is a drawing illustrating an example of an automated silent network authentication security and access control system 900 in accordance with an embodiment of the present disclosure. The system 900 may assess client device (e.g., electronic device 110-1) credentials and provide access, for the client device, to a security layer (e.g., silent network authentication protocol (SNAP) (e.g., access and security automation layer 1100).

For example, a client device 110-1 or an automated process may access system 900 to initiate messaging and/or communication channel campaigns. In particular a client dashboard 902 client and/or sub-client administrative panel 904 can gain operational access to message creation engine 906, and/or enable sub-client administrative panel 904 to gain operational access to message creation engine 906, to undertake communications and/or messaging campaigns to sub-client subscriber vault subscriber(s) 908 captured through system subscriber funnels that are stored in sub-client subscriber vault. In general, sub-client assets 912 may be system-warehoused and accessible through client assets aggregator API 910 by way of connection to sub-client asset aggregator 914 and/or system asset compiler 916, which may enable sub-client assets 912 to surface within either 902 client dashboard and/or sub-client administrative panel 904 for inclusion to communications and/or messaging campaigns compiled within message creation engine 906. Such communications and/or messaging campaigns may be generated as navigable HTML web flows within decision delivery processor 918, and queued to machine learning/AI enabled decision engine (e.g., ML/AI cluster 1000a) within Automated Messaging Distribution Array (AMDA) generator 1000 (FIG. 10) via 201 automated/manual message campaign trigger to sub-client subscriber vault 908 subscribers; or, any one or more sub-client subscriber vault 908 subscribers associated with algorithmically defined consumer behavior data, described elsewhere herein and located in sub-client subscriber vault 908. Settings for the automated/manual message campaign trigger 922 can be established in either of client dashboard 902 and/or sub-client administrative panel 904 to manually or automatically compile messages, in either instance with or without sub-client assets 912, to be combined with subscriber vault subscriber(s) 908 (e.g., user data previously stored at silent network authentication protocol layer 924) in preparation for generating an encoded and compiled short link 926 to render security software code processor engine security features via the access and security automation layer 1100 (FIG. 11), for example, and/or other system attributes into the compiled and encoded short link 926 and/or engagement method, delivering short link 926 and/or engagement method to ADDP 410 where each compiled short link 926 and/or engagement method attributes are stored, thereafter enabling system 900 to continue to AMDA system 1000 for message delivery characteristics to be generated, as described elsewhere herein.

Automated Messaging Distribution

Figure 10:
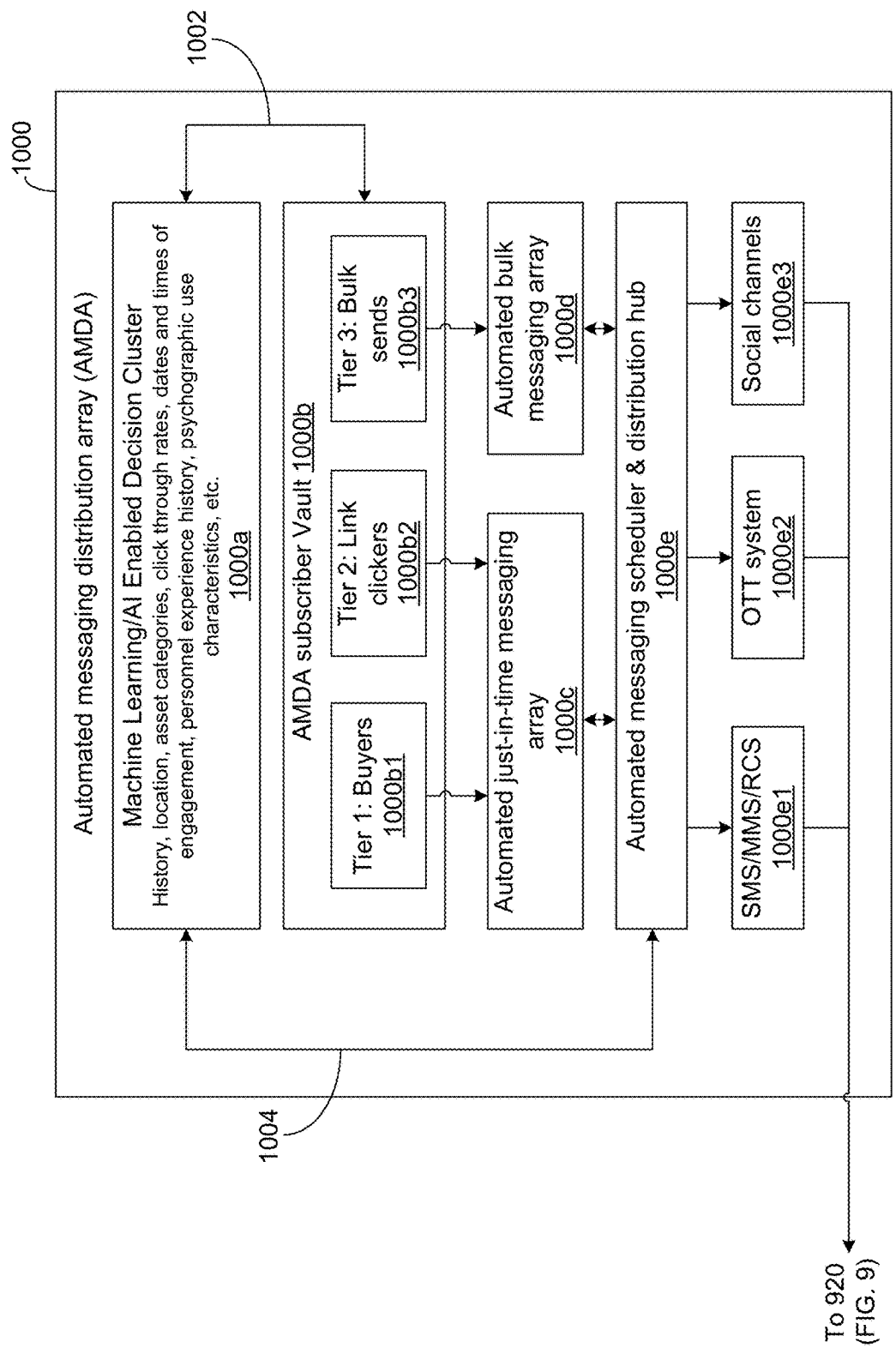
FIG. 10 is a drawing illustrating an example of an automated messaging distribution array generator, in accordance with an embodiment of the present disclosure.

FIG. 10 is a drawing illustrating an example of the automated messaging distribution array (AMDA) system 1000, in accordance with an embodiment of the present disclosure. In general, the AMDA system 1000 may utilize a messaging subscription and distribution system (e.g., hub 1000e) that automates the process of sending messages across various channels, to ensure efficient and timely delivery of messages to subscribers. The AMDA system 1000 may utilize algorithms, rules, and and/or ML/AI to manage the timely distribution targeting a particular audience at a particular calculated time and may do so according to a particular geographic location of a subscriber. The messages may include determined offers and/or opportunities and personalized messages based upon predefined criteria. Such messages may be generated and sent according to text messaging regulations, FCC, TCPA, or other communication regulations associated with contacting consumers.

The AMDA system 1000 may support a variety of messaging channels including at least SMS/MMS (e.g., text messages), Rich Communication Services (RCS) platforms, and Over-the-Top (OTT) platforms. Integrating such a combination of messaging channels allows for a broad reach across different communication platforms, enhancing the ability to effectively target a subscriber or audience. The AMDA system 1000 may leverage RCS capabilities to deliver high-resolution photos, videos, and/or audio messages, other media and file formats, interactive media, augmented reality, virtual reality and/or internet of things controls. The AMDA system 1000 may also support real-time typing indicators, read receipts, and interactive elements such as buttons, radial dials, dropdowns, shopping carts, and carousels/carousel menus. These features may provide a subscriber with an engaging and interactive user experience compared to conventional SMS or email campaigns. The AMDA system 1000 may also utilize ML/AI technologies to ingest and analyze data, enabling personalized and targeted messaging campaigns as well as automated scheduling determination. This AMDA system 1000 can identify, match, compare, and organize subscriber data into specific tiers based on engagement levels in order to determine appropriate and/or otherwise convenient message delivery. The AMDA system 1000 may generate and use automated just-in-time messaging arrays to determine a convenient time to send messages to subscribers based on subscriber location, activities, and/or preferences. The arrays may ensure that messages are delivered at a time that may increase a likelihood of receiving engagement from the subscriber. The AMDA system 1000 may be enabled to adhere to regulatory blackout periods and other compliance requirements (e.g., regulatory compliance, user permission compliance, user preferences compliances, etc.), which allows the AMDA system 1000 to be used and/or modified for business operating in multiple jurisdictions or in industries with specific regulatory frameworks.

In AMDA 1000, ML/AI cluster 1000a may ingest message campaign delivery characteristics defined in client dashboard 902 and/or sub-client administrative panel 904, as well as compiled and encoded short link details 926, and systematized campaign attributes captured in ADDP 410 (via decision delivery processor 918, for example) where prior subscriber vault subscriber(s) 908 activities and related subscriber vault subscriber(s) personalized experiences including, but not limited to usage history, asset categories, click-through rates, timing engagement and psychographic use characteristics, etc. (collectively, —subscriber use history—) may be stored and enabled to parse incoming individualized subscriber data with their individualized pre-existing subscriber use history. Such storing and parsing may further enable ML/AI cluster 1000a to identify, match, compare, and organize each subscriber vault subscriber(s) 908 recipient(s) of a specific message campaign being triggered from client dashboard 902 and/or sub-client administrative panel 904 into one of three subscriber vault tiers of AMDA subscriber vault 1000b, as shown by arrow 1002. The process of categorizing subscribers may be iterative, as indicated by the two-sided arrow 1002. The AMDA subscriber vault 1000b may include data from vault 908. The vault tiers may include tier 1 buyers 1000b1, tier 2 link clickers 100b2, and tier 3 bulk senders 1000b3. The tier 1 buyers 1000b1 may be defined as those subscribers who have previously engaged with compiled and encoded short links 926 and/or other engagement methods with system 900, for example which could include a user call to action element and/or a transaction element within the context of an intra-application action like RCS, OTT, etc. and/or as a result of system user engagement attributions that could be received by the system from secondary channel(s) delivering to the subscriber recipient within the outside channel(s) the same or similar opportunity that the user engaged with and/or completed a transaction from, the system may log the outside channel attribution such that the user could be graduated to the higher system tier as a result of the outside channel system attributed user behavior and completed the defined customer journey attributed within compiled and encoded short links 302 and/or other engagement method with any of an ecommerce purchase opportunity, registering within a registration opportunity, completing navigation through a defined navigation journey, etc. and as such, are queued for message delivery characteristics defined outside of tier 2 link-clickers 1000b2 and/or 1000b3 tier 3 bulk-send recipients 1000b2. Tier 2 link-clickers 1000b2 may be defined as subscriber vault subscriber(s) 908 who have previously engaged with compiled and encoded short links 926 and/or other engagement method, but have not completed the intended ecommerce purchase opportunity, registration opportunity, and/or intended navigation journey, etc., and as such, are queued for message delivery characteristics defined outside of tier 1 buyers 1000b1 and/or tier 3 bulk-send recipients 1000b3. Tier 3 bulk-send recipients 1000b3 may be defined as users that have not clicked through any of the received compiled and encoded short links 926 sent from one or more message campaigns initiated by client dashboard 902 and/or sub-client administrative panel 904, and as such may be queued for message delivery characteristics defined outside of tier 1 buyers 1000b1 and/or tier 2 link-clickers 1000b2.

For example, for tier 1 buyers, the delivery characteristics operate through the just-in-time messaging component of the AMDA 1000. In such examples, each message sent may be one of many messages sent and/or constantly being triggered for sending at incongruent, non-linear times secondarily within regulated non-blackout periods within the area codes associated with a particular time zone. Each of the send times for the messages are generally governed according to various time-based factors including the psychographic footprint of each individual recipient related to their preferred receipt times based on prior link click days of the week and/or times of day the recipient(s) engaged, whether the recipient(s) have a differing content propensity on any given day as compared to any other day, whether the recipient(s) engage deeper into a provided UX at a given specific time and/or weekday, which days and times are the recipient(s) more apt to complete a UX journey and/or complete a purchase, etc.

For Tier 2 link clickers, all of the above Tier 1 assessment applies except that the systems described herein does not have the subscriber recipients purchase propensities as the subscriber has yet to make a purchase or perform a transaction, or undertake the defined navigation journey, and are instead engaging with links and/or navigating UX interfaces.

For tier 3 bulk-send recipients, the AMDA 1000 does not have any clicked-link feedback data from the recipients of messages, and therefore the systems described herein may discern message sending procedures against (1) the regulatory frameworks and blackout period restrictions on a geographically area-code defined basis, otherwise using more of (2) an all-at-once, bulk-sending procedure/methodology.

Upon completion of defining tier 1 buyers 1000$b1$, tier 2 link-clickers 1000$b2$, and tier 3 bulk-send recipients 1000$b3$ within AMDA subscriber vault tiers 1000$b$, the AMDA system 1000 may designate 1000$b1$ tier 1 buyers and 1000$b2$ tier 2 link clickers 1000$c$ to an automated just-in-time messaging array 1000$c$. The AMDA system 1000 may use subscriber use history characteristics to enable the generation and use of the automated just-in-time messaging array 1000$c$ to determine when to send campaign messages to which subscribers at what time of day in any of various geographic locations in a manner that includes defined characteristics and regulatory blackout periods relative to any given ecommerce purchase, registration opportunity, and/or defined navigation journey, etc. The characteristics, and regulatory blackout periods may be procured and compiled against subscriber(s) use history and varying personalized experiences captured and stored within ML/AI cluster 1000$a$ in an ongoing and continuously sequenced methodology. For example, the continuous sequencing may be performed to determine particular subscriber location, subscriber activities, and subscriber preferences such that each subscriber timely receives messages sent from automated just-in-time messaging array 1000$c$ carrying compiled/encoded short links 926 of which unique variants identified, compiled, and attributed within ML/AI cluster 1000$a$ to such subscriber vault subscriber(s) 908 to enable message campaign recipient(s) subscriber(s) to navigate through the personalized experience(s) the AMDA system 1000 has sent through the automated just-in-time messaging array 1000$c$.

Correspondingly, tier 3 subscribers 1000$b3$ that have not engaged with compiled/encoded short links 926 sent through various ongoing message campaigns may be designated by the AMDA system 1000 to automated bulk messaging array 1000$d$, which possesses similar characteristics as automated just-in-time messaging array 1000$c$ relative to regulatory blackout periods and other defined characteristics, resulting in message campaigns originating from the systems described herein to relevant tier 3 subscriber vault subscriber(s) 1000$b3$ of one or more specific campaign(s) message(s) being sent at the same time according to predefined time periods and other related system factors defined by ML/AI cluster 1000$a$.

The automated bulk messaging array 1000$d$ may provide an option for use with subscribers less engaged in the overall system. For example, if a subscriber has yet to engage in a particular message sent by the system described herein (i.e., a tier 3 subscriber 1000$b3$, new subscribers of the system 1000, etc.). The array 1000$d$ may be provided to allow for efficient management and distribution of messages to larger groups without having to individually customize the messages/content/campaigns.

For example, the just-in-time messaging array 1000$d$ may compile a standardized message that can be sent to a group of large and/or small tier 3 recipients, and/or a singular tier 3 recipient that had subscribed to a particular e-commerce retailer, but had never engaged with any of the compiled short link 926 they received from that retailer in the past, to notify the tier 3 group of subscribers of a sale on one of their ecommerce products in an attempt to induce the subscribers to engage with the compiled short link 926 and potentially complete an ecommerce purchase transaction.

Depending on which tier from vault 1000$b3$ outputs data, the automated just-in-time messaging array 1000$c$ or the automated bulk messaging array 1000$d$ may provide data to the automated scheduler and distribution hub 1000$e$. In addition, the ML/AI cluster 1000$a$ may also provide input in decisions associated with the automated messaging scheduler and distribution hub 1000$e$, as indicated by arrow 1004. Decisions may be iteratively made and/or information may be shared between hub 1000$e$ and ML/AI cluster 1000$a$ as a basis in which to generate and send particular messages to subscribers.

For example, time-oriented characteristics related to tier 1 buyers 1000$b1$ and tier 2 link-clickers 1000$b2$ may be defined based on decisions generated at ML/AI cluster 1000$a$, which may trigger automated scheduler and distribution hub 1000$e$ to define detailed aspects relating to each individually specific subscriber vault subscriber(s) 908 queued in automated just-in-time messaging array 1000$c$, such that defined campaign messages are sent by cluster 1000$a$ at specified times on a one-at-a-time and/or many-at-a-time segmentation basis to each individual subscriber/vault subscriber 908, vis a vis, just-in-time, whereafter the automated scheduler and distribution hub 1000$e$ may route system campaign message(s) to various distribution channels defined by ML/AI cluster 1000$a$. The distribution channels may include, but are not limited to SMS/MMS (e.g., text message channels), Rich Communication Services (RCS) channels 1000$e1$, Over-the-Top (OTT) messaging channels 1000$e2$ (e.g., WhatsApp®, Meta Messenger®, Viber®, etc., and/or social networking channels 1000$e3$, such as social channels from Meta Platforms Inc., X Corp., Apple Inc., or the like). Subscribers may receive messages on channels 1000$e1$, 1000$e2$, and/or 1000$e3$ based at least in part on which channel (and/or which application) a subscriber engagement originated from. For example, if a tier 2 subscriber engaged with link 926 using WhatsApp®, then the hub 1000$e$ may trigger any follow on messages or follow on content to be distributed to the subscriber through the WhatsApp® application. Other scenarios of messaging are possible and may include distribution of messages based at least in part on subscriber preferences, subscriber permissions, or other user-based engagement characteristics.

Correspondingly, time-oriented characteristics related to tier 3 automated bulk messaging array 1000$b3$ may be defined and/or otherwise influenced from decisions generated at ML/AI cluster 1000$a$, which may trigger automated scheduler and distribution hub 1000$e$ to schedule bulk campaign message sends at times specified by ML/AI cluster 1000$a$, whereafter automated scheduler and distribution hub 1000$e$ may route campaign message(s) to various distribution channels defined by ML/AI cluster 1000$a$, which can include SMS/MMS text message channels/RCS channels, and/or OTT messaging channels, as described elsewhere herein.

Referring again to FIG. 9, the AMDA 1000 may use 3PP service provider API endpoint 920, which truncates system campaign messages to be delivered from client/sub-client program message campaign number 930 through various third party mobile carriers 932 that deliver campaign messages (e.g., C1, C2, C3) to allocated subscriber vault subscriber(s) 908 at subscriber messaging recipient cell numbers 934 in just-in-time campaign message-send sequencing defined by ML/AI cluster 1000$a$ and executed by AMDA subscriber vault 1000$b$ through automated just-in-time messaging array 1000$c$ and/or automated bulk messaging array

1000*d*, according to the campaign message distribution schedule articulated through ML/AI cluster 1000*a*. The campaign messages may be thereafter queued into, and carried out accordingly by automated messaging scheduler and distribution hub 1000*e* (FIG. 10). At cellular phone messaging apps 936, subscriber vault subscriber(s) 908 that received system messages at subscriber messaging recipient cell numbers 934, the compiled and encoded short links 926 can be activated by subscriber vault subscriber(s) campaign message recipient 938, which triggers opening of a customized UEMWEB loader 940 (and/or third party domain within a web browser) on subscriber vault subscriber(s) 908/campaign message recipient(s) cellular phone, which continues to silent network authentication protocol (SNAP) access and security automation layer 1100.

When compiled and encoded, short link 926 is activated at message recipient link activation 938 by subscriber vault subscriber(s) 908, the customized UEMWEB loader 940 (and/or third party domain) triggers the SNAP access and security automation layer 1100 to activate an entry software code packet for a security automation layer and instance identifier associated with entry software code packet for security automation layer and instance ID 1100*a*.

The operations performed by the systems described herein may utilize ML and/or AI modules, such as the machine learning/AI enabled decision cluster 1000*a*. The cluster 1000*a* may include or utilize one or more large language models (LLMs), a recurrent neural network (RNN) model, a transformer model, and/or any other type of ML model capable of analyzing messaging scheduling, user input, cellular data, or the like; memory for storage of data and/or software applications; one or more processors for accessing data and executing the software applications; and/or other components that may facilitate communication over one or more cellular networks (e.g., network 118), Wi-Fi networks (e.g., signals 126), wired networks, or other networks. In some embodiments, one or more of the software applications can be installed locally at the mobile computing device (e.g., device 110-1). In some embodiments, one or more of the software applications can be hosted remotely (e.g., by one or more servers) and can be accessible by the mobile computing devices over one or more of the networks.

The ML/AI cluster 1000*a* architecture may include a number of modules or layers that may perform the operations described herein. The modules or layers may include: a data ingestion layer that gathers real-time and batch data such as user interactions (clicks, views, purchases), product information, and user profiles. This layer ensures data is consistently and reliably imported into the system for processing; a data storage layer which acts as the backbone of the system by utilizing databases, data lakes, or data warehouses to handle large volumes of diverse data used for processing and analysis; a data processing and feature engineering module which, amongst other processes, cleans, transforms, and enhances data so that it is made suitable for use in machine learning models, a data models training layer for creating models, based on collaborative filtering, content-based models, hybrid, or other approaches, that can make accurate and relevant recommendations. For example, data gathered at 938 and 940 can be utilized, on top of data originally ingested, to continually refine and tighten up the models over time; a models serving and deployment layer for managing model versions and integrating models into the system, ensuring they are accessible and performant; a real time recommendation engine that utilizes deployed models to analyze user data and context, interfaces with applications and user interfaces, and undertakes seamless delivery of tailored suggestions. For example, the AMDA (1000*e*) can incorporate recommendations and/or recommendation information directly into messages and/or the destination behind included links being sent out via multiple messaging and/or social channels (1000*e*1, 1000*e*2, 1000*e*3). These messages and recommendations can then generate new data; an updating of feedback loops layer which collects data and feeds it back into the system to retrain models, thus adapting the system to ever changing user behavior. For example, data gathered at 938 and 940 can be fed back into 1000*a*; and a security and compliance layer that manages authentication and authorization, ensuring data privacy, security, and regulatory compliance. The feedback loops layer may provide a mechanism for monitoring ML/AI cluster 1000*a* machine leaning model(s) performance in real time and ensuring ongoing enhancements through iterative updates by integrating five functions including (1) performance monitoring, (2) feedback aggregation, (3) ML/AI cluster 1000*a* machine learning model re-training and update automation, (4) continuous learning and adaptation, and (5) feedback loop optimization to ensure that the ML/AI cluster 1000*a* remains adaptable, efficient, and aligned with real-world data and user interaction to drive immediate modules and/or layers improvements s, as well as a security and compliance layer for assessing and providing secure access and/or secure authorization for users accessing content and/or performing actions associated with the content.

Access and Security Automation Layer

Figure 11:
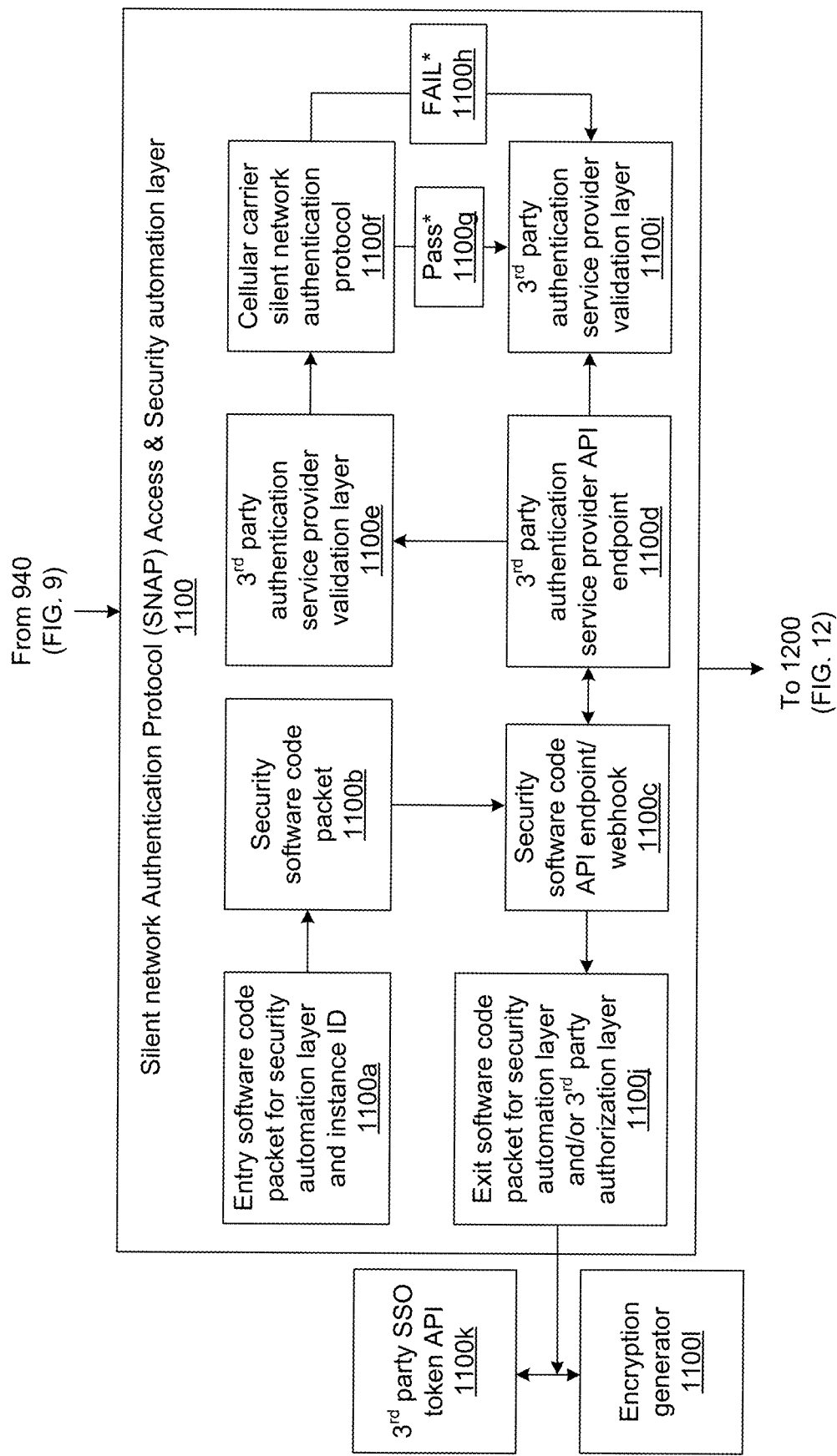
FIG. 11 is a drawing illustrating an example access and security automation layer, in accordance with an embodiment of the present disclosure.

FIG. 11 is a drawing illustrating an example access and security automation layer 1100, in accordance with an embodiment of the present disclosure. The layer 1100 may provide security for accessing content. The layer 1100 may use a SNA-based security automation layer, which assesses client device credentials and provides secure access. The layer 1100 may also utilize encoded and compiled short links (e.g., links 926) with security software code, enhancing the overall security of transmitted and accessed messaging campaigns.

In general, the security of layer 1100 may be used alone or in conjunction with the security mechanisms described herein. In a non-limiting example, the layer 1100 may provide a multi-stage security mechanism on a webpage, website, micro-website, UEMWEB, or application which integrates existing security functionality together with biometric authentication, utilizing facial identification, fingerprint identification, or other biometric frameworks in conjunction with, or separately from Silent Network Authentication (SNA) (e.g., layer 1100) to provide security for user login (e.g., access) and transaction processes. Upon access attempt, for example, the layer 1100 may prompt a user for biometric verification to leverage the local authentication framework to ensure the requestor is the legitimate owner of the device requesting access. Concurrently, the layer 1100 may use SNA to operate in the background, silently verifying the network credentials of the user device (e.g., phone number, SIM card identifier, etc.) without user interaction.

For example, the layer 1100 may analyze one or more of a SIM card identifier or related information and may also analyze network usage patterns to confirm the identity of the user of the device requesting access. This dual-layered approach may ensure a seamless, convenient, and secure user experience, significantly reducing the risk of unauthorized access while protecting sensitive data. In a nonlimiting example, a subscriber may receive an SMS marketing message on a mobile device and may select a link within the message to land on a product webpage. The subscriber may select particular product variables and add an item to an online or application-specific shopping cart. The subscriber may move to a checkout area and select an order/purchase control. The shopping cart/application may prompt the user to execute biometrics, such as a face scan, fingerprint scan, etc. The shopping cart/application may perform the biometric confirmation (e.g., scan a face, scan a fingerprint, etc.) and may perform an SNA authentication process (as described elsewhere herein) in a background process (e.g., substantially simultaneously to the biometric confirmation, subsequent to the biometric confirmation, or prior to the biometric confirmation). If both the biometric confirmation and the SNA authentication produce valid identification checks for the subscriber, then the transaction may execute to purchase the content of the shopping cart.

In another non-limiting example, a subscriber may receive an SMS marketing message on a mobile device and may select a link within the message to land on a product webpage. The subscriber may select particular product variables and add an item to an online or application-specific shopping cart. The subscriber may move to a checkout area and select an order/purchase control. In the event that the device being used to navigate the shopping cart/application does not include biometric capabilities, the biometric confirmation process can be skipped and the SNA authentication process may instead be substituted as the singular security check. If the SNA authentication produces a valid identification check for the subscriber, then the transaction may execute to purchase the content of the shopping cart.

The layer 1100 includes security features within the AMDA system 1000. The security features may enhance the security of communications and the security of access control. The layer 1100 represents a SNA-based layer for authenticating devices and users (e.g., subscribers, user devices, bots, companies, etc.) silently and securely, ensuring that access to the system 1000 associated data are both controlled and monitored without compromising user experience or system performance. The layer 1000 includes at least one authentication server for managing authentication requests and processes. The at least one authentication server may store and handles security credentials and policies. Client devices may each have a unique identifier and associated credentials. In some embodiments, the unique identifier is an identifier associated with a SIM card. The layer 1000 may utilize one or more security tokens (e.g., JWT-JSON web tokens) that encapsulate the identity and credentials of the client device. These tokens may be encrypted and can be decrypted by the at least one authentication server. The layer 1000 utilizes encryption algorithms (e.g., Advanced Encryption Standard (AES), Rivest-Shamir-Adleman (RSA), etc.) to secure the tokens and data transmitted between the client devices and the at least one authentication server. The layer 1000 may include any number of API endpoints providing secure points of communication between the client devices and the authentication server, through which authentication requests and responses may be sent.

In a non-limiting example, the layer 1000 may receive an access request from the AMDA system 400 from a client device (e.g., a mobile phone device, a table device, etc.). The layer 1000 may generate and send a request to an authentication server to obtain a security token. This request may include the device credentials and unique device identifier (e.g., SIM card identifier). The authentication server may attempt to verify the device credentials and proceed to verify a security token if the credentials are verified. The token may include a device identity (e.g., SIM card, phone number, etc.) and particular session data. The token may also be encrypted using a secure encryption algorithm to deter tampering or forgery. The encrypted token may be transmitted back to the device via a secure API endpoint, for example, and the client device may use the token for subsequent requests to review links, make purchases, shop online, etc. Each time the client device generates and sends a request to the AMDA system, the encrypted token may be included with the request. The authentication server may decrypt the token, validate the token and grant or deny access to the links, purchases, shopping activities, etc. based on the determined validity of the token and/or based on permissions assigned to the token. The SNAP layer 1100 may manage sessions by setting expiration times on the tokens and monitoring session activities. The usage or detection of an expired token may trigger reauthentication to ensure access is securely controlled.

In some embodiments, the layer 1100*a* may perform SNA authentication coupled with the calculating, interpreting, and compiling of particular data identifiers, such as cellular numbers, device types, locations, usage patterns, and more, which can be applied to a wide range of real-world use cases that can span across industries like telecommunications, marketing, financial services, healthcare, and logistics, utilizing silent authentication, real-time data processing, and AI-driven decision-making to enhance user experiences and improve operational efficiency while also improving security across multiple domains. Examples of this can include, but are not limited to, dynamic customer segmentation for personalized messaging where the system compiles data from user cellular numbers and interprets their behavioral and geographical patterns (e.g., frequent roaming users, heavy data users, etc.) to automatically segment subscribers into highly specific categories based on past communication habits, device usage, etc.; and, real-time spam and fraud detection for messaging services to detect fraudulent or spam messages in real-time, protecting users from phishing attempts or malicious content through the system calculating and compiling patterns from previous message metadata, including sender numbers, content analysis, and user interaction patterns while continuously monitoring for anomalies in message delivery (e.g., unusual spikes in message volume from a single number or certain keywords associated with phishing) where the ML/AI cluster 1000*a* can silently authenticate the source of a message, ensuring that it is coming from a legitimate cellular number and not from a spoofed or fake number, and so on; and, location-based services and geo-fencing for marketing campaigns where a marketing entity uses the system's ML/AI cluster 1000*a* to send location-based offers to subscriber customers who enter a particular geographical zone and the system silently authenticates the user's cellular number and uses real-time location data to calculate proximity to potential offerings of specific interest to the subscriber based upon having previously compiled and interpreted the customer's past engagement behaviors to determine the best offer to send to their device based on their preferences, and so on; and, silent authentication for seamless user login and verification where a link 926 could use silent network authentication via the ML/AI cluster 1000*a* to verify user identity without requiring an SMS-based one-time password (OTP) or other more cumbersome validation methods such as email confirmations, etc., where instead the system silently authenticates the user's cellular number by communicating directly with the mobile network, verifying that the SIM card and phone number are associated with the user's registered account and further or prior verifications through system compiled data relative to the user's device type, location, and usage patterns to additionally confirm that the login attempt(s) match historical usage behavior, and so on, whereafter the user is granted access without needing to enter an OTP, making the login process frictionless and secure.

In operation, the layer 1100*a* may pass a security software code packet 1100*b* through security software code API endpoint/webhook 1000*c* to third party authentication services provider API endpoint 1100*d*, which enables third party authentication services provider validation layer 1100*e* to identify subscriber messaging recipient cellular number(s) and other variables including encryption specifics, etc. that enable system truncation to the appropriate third party mobile carrier network to execute a cellular carrier SNAP 1100*f* to establish a pass or fail status, where if the carrier SNAP responds back with a PASS status 1100*g*, then 600*i* the third party authentication services provider validation layer 1100*i* passes the PASS status 1100*g* through third party authentication services provider API endpoint 1100*d* to security software code API endpoint/webhook 1100*c*, etc. delivering the PASS status 1100*g* to a security automation layer exit software code packet 1100*j* and/or 3rd party authorization, which calls third party SSO token API 1100*k* to acquire a single sign-on token that is embedded into an encryption string created within 600*l* an encryption generator 1100*l* that gets passed through automation layer exit software code packet and/or third party authorization exit software code packet for security automation layer and/or third party authorization layer 1100*j* to be included in links generated by short link encoder/compiler 926, where subscriber vault subscriber(s) campaign message recipient(s) customized UEMWEB loader and/or a third party domain journey is enabled with the specific augmented access and unique navigation attributes made available through the SNAP access and security automation layer 1100. However, if cellular carrier SNAP 1100*f* responds back with a FAIL, then the third party authentication services provider validation layer 1100*i* may pass the FAIL status through the third party authentication services provider API endpoint 1100*d* to security software code API endpoint 1100*c*, which delivers the FAIL status to the exit software code packet for security automation layer and/or third party authorization layer 1100*j*, where the subscriber vault subscriber(s) campaign message recipient(s) customized UEMWEB loader and/or third party domain journey is not enabled with the specific augmented access and unique navigation attributes made available from SNAP access and security automation layer 301. Next, the flow may continue to the automated security verification hub 1200 (FIG. 12).

Automated Security Verification Hub

Figure 12:
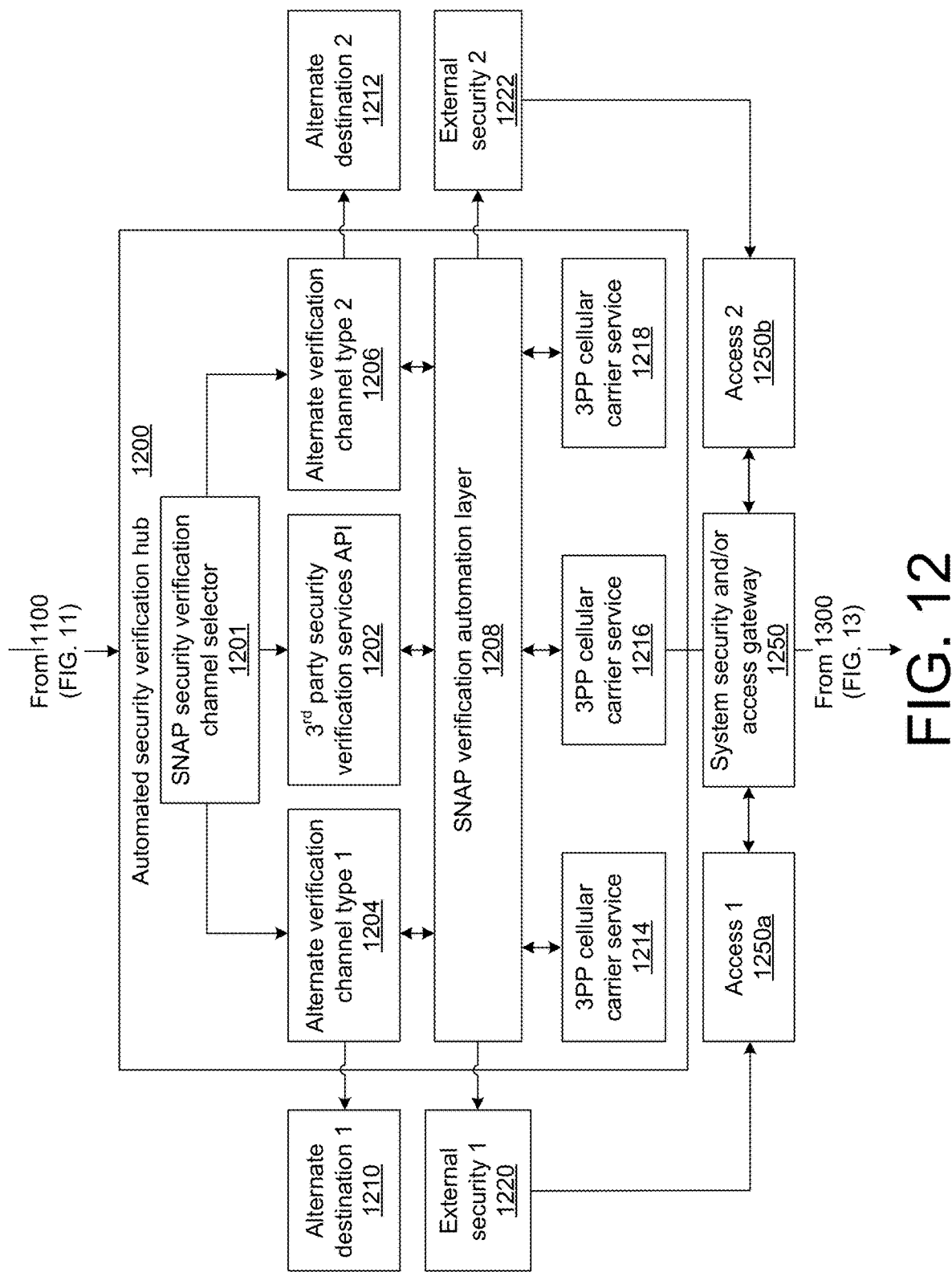
FIG. 12 is a drawing illustrating an example of an automated security verification hub, in accordance with an embodiment of the present disclosure.

FIG. 12 is a drawing illustrating an example of an automated security verification hub 1200, in accordance with an embodiment of the present disclosure. In operation, data and/or messages may be received from the SNAP layer 1100 (FIG. 11) including PASS and/or a FAIL indication/ statuses 1100*g*, 1100*h* at a SNAP security verification channel selector 1201. The selector 1201 may distribute the PASS/FAIL through one of at least three pathways including a third party security verification services API 1202, a first alternative verification channel 1204, and a second alternative verification channel 1206. If a PASS status is received, the data and/or messages may be provided to a SNAP verification automation layer 1208 within SNAP verification layer 1308 (occurring within an HTML experience). If a FAIL status is received, the data and/or messages may be provided to the layer 1208 using either channel 1204 or channel 1206 to allow for different security screening. For channel 1204, a first alternate verification may occur using external verification system, as shown by alternate destination 1210. Similarly, a second alternate verification may occur using external verification system, as shown by alternate destination 1212. Similar data or output from destinations 1210, 1212 may also be provided to SNAP layer 1208 to continue a cellular data-based authentication process using third party cellular service 1214, third party cellular service 1216, and/or third party cellular service 1218. In addition, or instead, external security authentication can be performed using external security 1220 and/or external security 1222. For example, a security verification process/type can be selected for external security 1220 and/or external security 1222 including one or more, or any combination of system access code security sent using SMS and/or MMS, biometric security, password or PIN code based security, or the like.

The SNAP verification automation layer 1208 may determine which type of security verification is to be used. For example, a security verification process/type can be selected amongst one or more, or any combination of SNAP security, system access code security sent using SMS and/or MMS, biometric security, password or PIN code based security, or the like, where after determining a security type, the system verification automation layer 1208 may truncate a system pathway into 3PP cellular carrier service 1214, cellular carrier service 1216, and/or cellular carrier service 1218, and/or to external security 1220 and/or external security 1222, etc. to gain access to system security and/or access gateway 1250, which can distribute data and/or messages to and/or from external access ports 1250*a*, 1250*b* and so on, or directly to internal access ports 1300 (FIG. 13) where subscriber vault subscriber(s)/campaign message recipient (s) receiving PASS status 1100*g* or FAIL status 1100*h* may pass through system recipient user experience, navigation, and/or purchase journey resulting from an unpacked compiled and encoded short link 926 at carrier/noncarrier access port 1300. In some embodiments, access may be received from external security 1220 at access block 1250*a* and/or received from external security 1222 at access block 1250*b*.

Security/Access Protocol Selection

Figure 13:
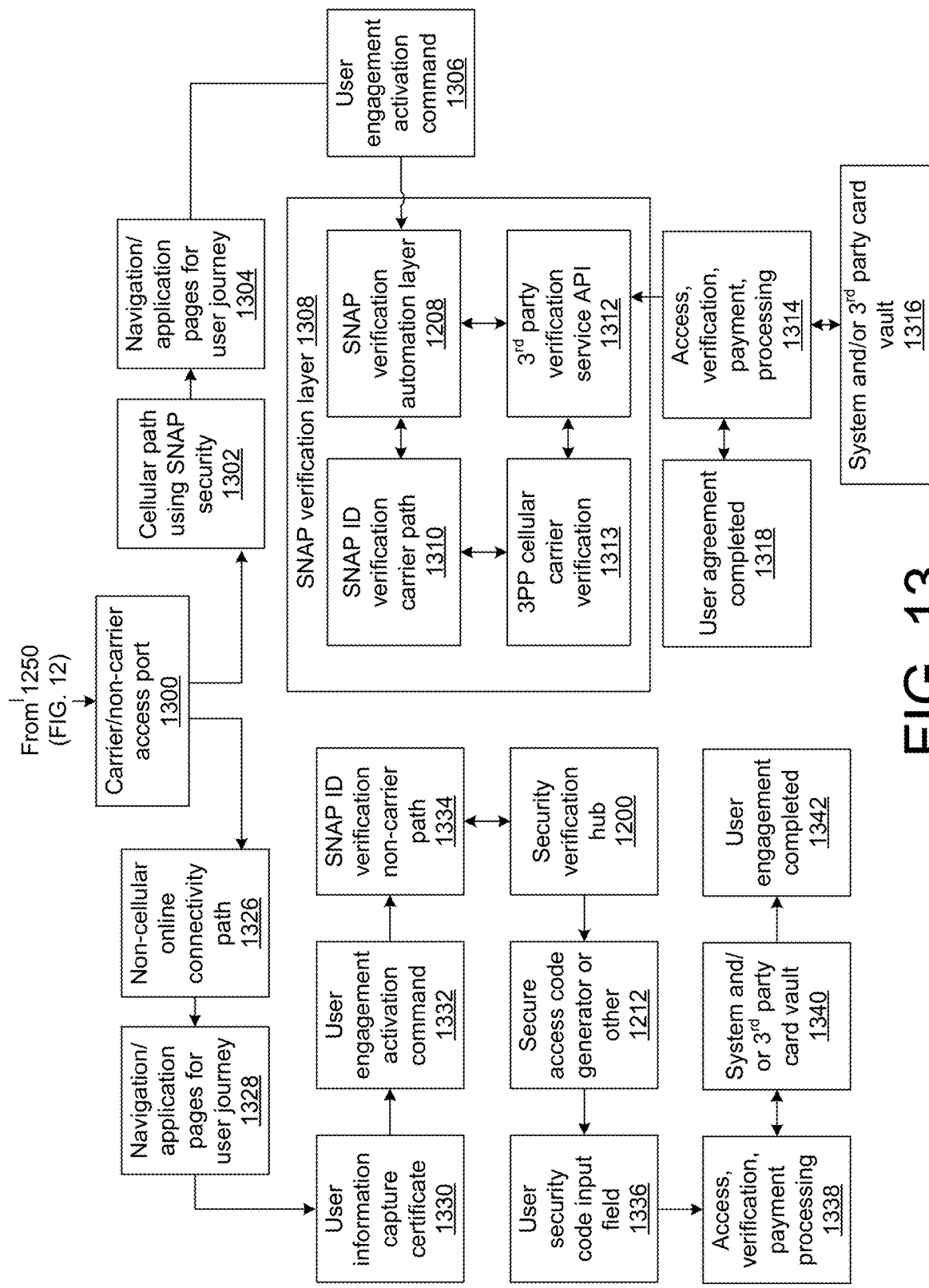
FIG. 13 is a drawing illustrating an example flow diagram representing selection of a first security protocol or a second security protocol, in accordance with an embodiment of the present disclosure.

FIG. 13 is a drawing illustrating an example flow diagram representing selection of a first security protocol or a second security protocol, in accordance with an embodiment of the present disclosure. The carrier/noncarrier access port 1300 may receive data, messages, and/or approval/authentication from security and/or access gateway 1250 (FIG. 12). In general, the carrier/noncarrier access port 1300 may direct a navigation journey of subscriber vault subscriber(s) 908/ campaign message recipient(s) flagged with a PASS status 1100*g* through cellular path 1302, which executes SNAP security within navigation pages 1304 for a user journey by user engagement activation command 1306 being triggered. Triggering command 1306 may trigger SNAP verification automation layer 1208 to process a navigation request through a secure SNAP ID verification carrier path security protocol 1310 to interoperate through third party verification services API 1312 (associated with third party authentication services provider API endpoint 1100*d* in FIG. 11) and 3PP cellular carrier verification 1313 to enable the SNAP verification channel selector 1201 to back-test and confirm a PASS status 1100*g* to enable access, verification, and/or payment processing block 1314, and/or one-touch e-commerce payment, etc. to subscriber vault subscriber(s) 908 campaign message recipient(s) having received a PASS status 1100*g*, triggering 904 system and/or third party card vault 1316 to access payment and content to be purchased, for example, allowing subscriber vault subscriber(s) 908/campaign message recipient(s) having received the PASS status 1100g to complete a user experience, navigation, and/or purchase journey, as indicated by user engagement completed block 1318.

The carrier/noncarrier access port 1300 may instead direct a navigation journey of subscriber vault subscriber(s) 908/campaign message recipient(s) flagged with a FAIL status 1100h through a second security protocol that is a non-cellular security/access check. For example, subscribers 908 flagged with a FAIL status 1100h may be directed to an external security/access check and/or an internal, non-cellular security path at block 1326. A non-cellular security path includes performing security and/or access assessments without the use of cellular data, and instead utilizes local data on the mobile device and/or Bluetooth and/or Wi-Fi data to perform security and access operations. The block 1326 may pass the FAIL status and any subscriber data to particular navigation/application pages for user journey 1328 resulting from an unpacked compiled and encoded short link 1326, which directs the navigation journey of subscriber vault subscriber(s) 908/campaign message recipient(s) flagged as FAIL status 1100h to request information from the subscriber including user information capture certificate 1330 and thereafter activates user engagement activation command 1332, which triggers a SNAP ID verification non-carrier path 1334 to execute alternative security protocol(s) through security verification hub 1200 (FIG. 12), triggering the formation and delivery of an access code, PIN code, keyword, or the like. For example, the hub 1200 may generate a secure access code using secure access code generator at an external verification system, as shown by alternate destination 1212 and/or alternate destination 1210 and/or other security checkpoint and send a message with such a code to be delivered by SMS, MMS, RCS, OTT, and/or other delivery mode to subscriber vault subscriber(s) 908/campaign message recipient(s) receiving a FAIL status 1100h. The message may request that the subscriber 908 input the provided code in an input field 1336 (or the like), which may trigger access, verification, and/or payment processing block 1338 to retrieve payment credentials from system 900 and/or third party card vault 1340 to enable completion of subscriber vault subscriber(s) 908/campaign message recipient(s) (having a FAIL status 1100h) of a user experience, navigation, and/or purchase journey, as shown by user engagement completed block 1342.

In some embodiments, the first security protocol using cellular path SNA security of block 1302 may be performed and the second security protocol using non-cellular/online data of block 1326 may also or instead be performed in cases in which the first security protocol fails to allow access or security authorization for a subscriber/user of a mobile/client device. If the subscriber can gain access and/or security authorization through cellular data use in block 1302 (e.g., the first security protocol), then the subscriber may avoid having to utilize the non-cellular (e.g., second security protocol) starting at block 1326. This may provide a benefit (to the subscriber) of faster authentication to allow access, purchases, and/or other action that utilizes security checks and a benefit of allowing the subscriber to avoid additional data messaging and/or data input steps.

Figure 14:
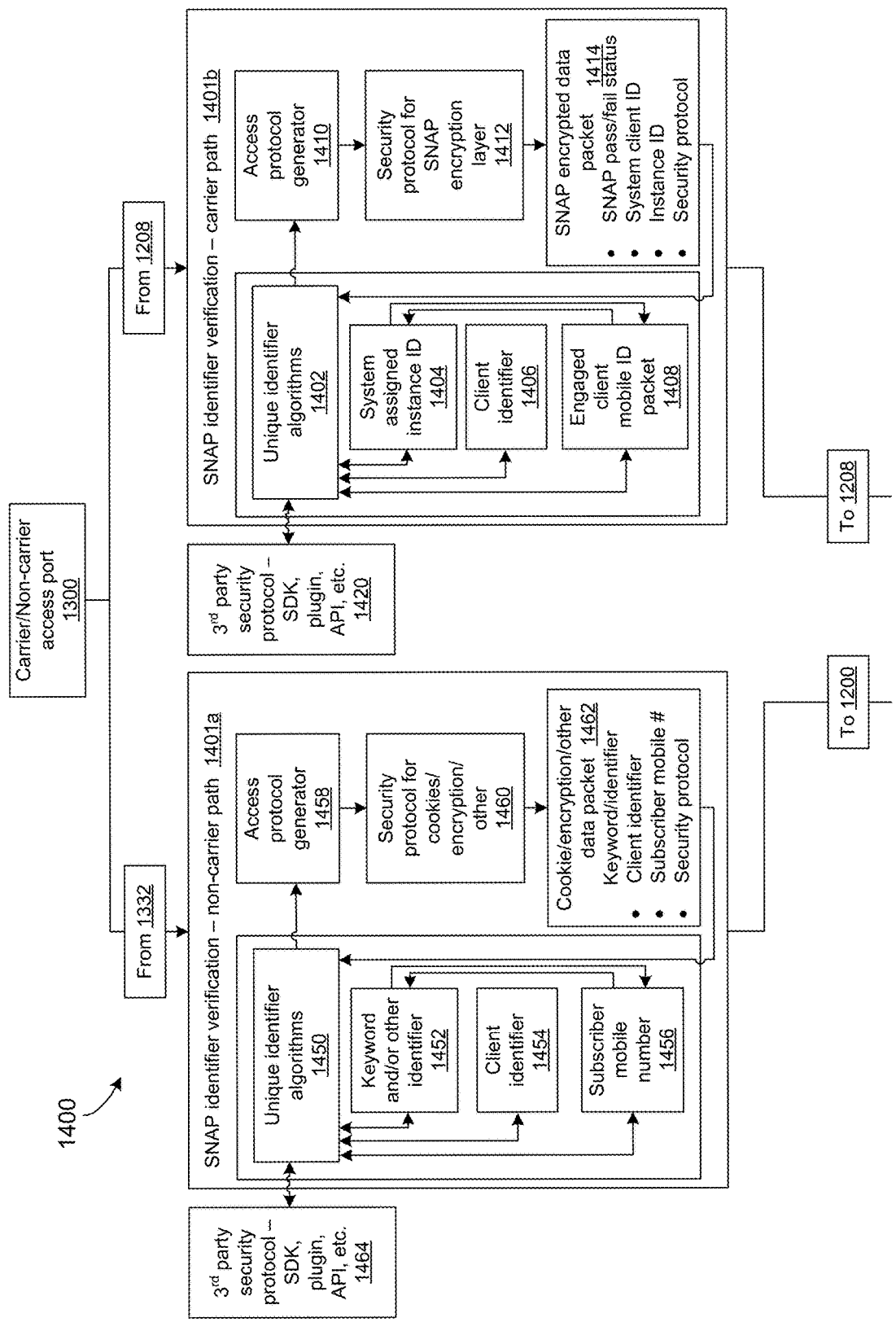
FIG. 14 is a drawing illustrating an example of performing a silent network automated protocol identifier verification process, in accordance with an embodiment of the present disclosure.

FIG. 14 is a drawing illustrating an example of performing a silent network automated protocol identifier verification process 1400, in accordance with an embodiment of the present disclosure. The process 1400 may begin at carrier/non-carrier access port 1300 and may use a non-carrier path through a user engagement activation command 1332 or may use a carrier path through SNAP verification automation layer 1208.

For example, when the SNAP access and security automation layer 1100 is activated for carrier path instances, SNAP verification automation layer 1208 may activate SNAP identifier verification 1401b—carrier path to run a confirmation cycle verifying that the PASS status is tied to the applicable verification session instance created at entry software code packet for entry software code packet for security automation layer and instance ID 1100a, where 701b/a unique identifier algorithms 1402 initiate system assigned instance ID verification 1404, and client identifier 1406 confirms that the verification session instance assigned at entry software code packet for security automation layer and instance ID 1100a has been assigned to the appropriate system client, and that the engaged client mobile ID packet 1408 corresponds to the identifying signature attributes assigned by entry software code packet for security automation layer and instance ID 1100a system operations to the user navigating the navigation/application pages for user journey 1304 during the SNAP verification automation layer 1208 processes which can include information such as browser type and version, operating system and version, screen resolution, time zone, language settings, device model, IP address, etc. Once confirmed, 701b/e access protocol generator algorithms 1410 prompt security protocol for SNAP encryption layer 1412 to formulate the encryption string to facilitate the creation of the SNAP encrypted data packet 1414 containing the SNAP PASS/FAIL status confirmed as attributable to the overall SNAP encrypted data packet 1414, as well as the confirmed system client ID, the confirmed session instance ID, and the confirmed SNAP security protocol, whereafter the SNAP encrypted data packet 1414 is passed to unique identifier algorithms 1402 to notify validation to verification automation layer 1208 for entry software code packet for security automation layer and instance ID 1100a and/or to third party security protocol 1420, a system SDK, a system plugin, and/or a system API endpoint, etc.

Alternatively, when the SNAP access and security automation layer 1100 is activated for non-carrier path instances, for example, using Wi-Fi and/or OTT communications, the user engagement activation command 1332 may activate SNAP identifier verification—non-carrier path 1401a to run a confirmation cycle verifying that the PASS status is tied to the applicable verification session instance created at entry software code packet for security automation layer and instance ID 1100a, where unique identifier algorithms to initiate system assigned instance ID verification 1450, where a keyword and/or other identifier 1452 confirms the verification session instance assigned to the system client at entry software code packet for security automation layer and instance ID 1100a. The obtained subscriber mobile number 1456 may be compared to a mobile number documented by SNAP access and security automation layer 1100 system operations to verify matching numbers. Upon successful confirmation access protocol generator algorithms 1458 prompt security protocol for cookies/encryption or other security check 1460 to formulate an encryption string to facilitate the creation of the cookie/encryption/other data packet 1462 containing the SNAP PASS status 1100g or FAIL status 1100h confirmed as attributable to the overall data packet 1462, the confirmed keyword/identifier, client identifier, subscriber mobile number, and security protocol. The data packet 1462 may be passed to unique identifier algorithms 1450 to notify validation to security verification hub 1200 and/or to third party security protocol, a system SDK, a system plugin, and/or a system API endpoint 1464.

Abandoned Journey/Abandoned Cart

Figure 15:
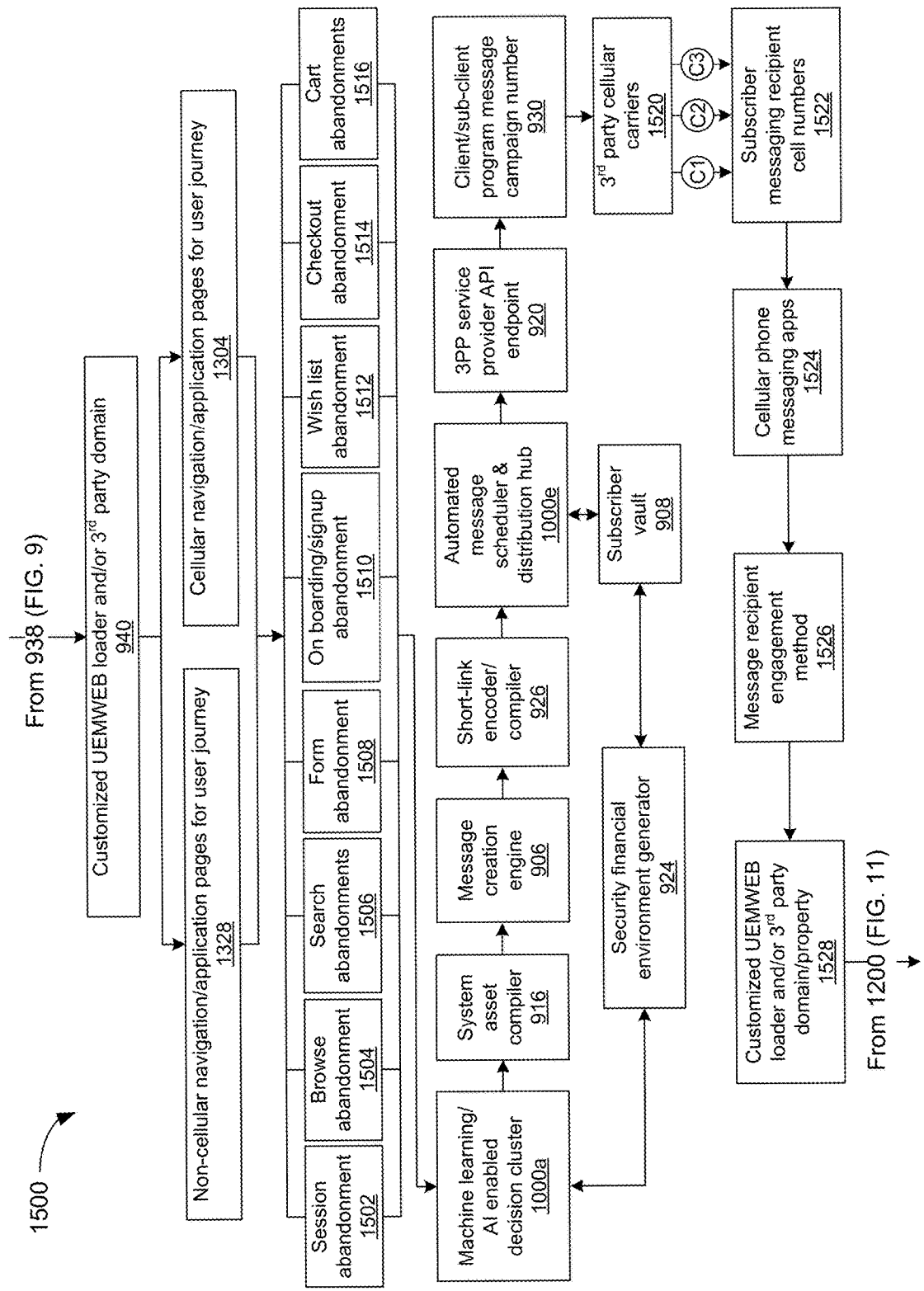
FIG. 15 is a drawing illustrating an example of handling one or more abandoned shopping experiences and/or other abandoned user journeys, in accordance with an embodiment of the present disclosure.

FIG. 15 is a drawing illustrating an example of handling one or more abandoned shopping experiences and/or other abandoned user journeys, in accordance with an embodiment of the present disclosure. The shopping experiences and/or abandoned user journeys may be online or offline. In some embodiments, such experiences or journeys may be performed online in an online application, web browser, app, or other interface. In some embodiments, such experiences or journeys may be performed offline or sandboxed in an offline application, offline web browser, offline app, or other offline interface.

In general, a user journey may include a series of steps or interactions that a user (e.g., a subscriber) takes while navigating through data, applications, and related user interfaces. In some embodiments, a user journey may be performed in a browser and may include a series of steps or interactions that the user (e.g., subscriber) takes while navigating through a website or web application. In some embodiments, a user journey may be performed in a browser and may include a series of steps or interactions that the user (e.g., subscriber) takes while shopping online. In some embodiments, a user journey may be performed in a browser and may include a series of steps or interactions that the user (e.g., subscriber) takes while generating a wish list online. In some embodiments, a user journey may be performed in a browser and may include a series of steps or interactions that the user (e.g., subscriber) takes while filling out a form, onboarding, or signing up for a service or product. In some embodiments, a user journey may be performed in a browser and may include a series of steps or interactions that the user (e.g., subscriber) takes while performing a search or browsing online. In some embodiments, a user journey may be performed in an app or application and may include a series of steps or interactions that the user (e.g., subscriber) takes while navigating portions of the app or application. In some embodiments, a user journey may be performed in an app or application and may include a series of steps or interactions that the user (e.g., subscriber) takes while navigating a checkout or purchasing process.

In general, the user journeys described herein represent a map of how users (e.g., subscribers) move from one page, user interface element, or action to another, starting from their initial entry point to a final goal (e.g., shopping online, generating a wish list, browsing the Internet, making a purchase, signing up for a service, and/or searching for information, just to name a few examples. Each user journey may include an entry point, an exploration navigation, one or more decision points, one or more actions, a completion point, and an exit point. The entry point may be a location within data in which the user first arrives, which could be a search engine, social media link, an app, or a direct link. The exploration navigation may include a map of locations, data steps, or the like in which the user navigates (e.g., through different pages, selections on links, and interactions with various user interface elements. The decision points may include locations in the data in which the user makes decisions based on goals, such as choosing products, filling out forms, generating wish lists, or deciding whether to stay on a website. The actions may include tasks that users complete during the journey such as adding items to a cart, signing up for a newsletter, filling a shopping cart, or downloading a file. The completion point may refer to a step in which the user achieves the goal of the journey such as completing a purchase, receiving a confirmation email, or successfully finding information. An exit point may be a location in the data in which the user abandons a partially completed journey or completes a task associated with the journey.

In some embodiments, the systems described herein may function to provide access to one or more abandoned shopping carts or other abandoned online interaction on an electronic platform. For example, the components of the Amplify system described herein may enable access, assessment, and management of abandoned carts associated with a user. In particular, the systems may provide one or more links in a delivered message (e.g., SMS, MMS, RCS, OTT, etc.) to allow a subscriber to access one or more abandoned carts from the link/message and to allow completion of transactions from within the message.

For example, during system orchestration of subscriber vault subscriber(s) 908 campaign message recipient(s) engagement through the customized UEMWEB loader and/or third party domain 940 may trigger links received from system communications and/or messaging campaigns. After selection on any number of links, subscribers may abandon any of the various engagement steps within the noncellular navigation user journey 1328 and/or cellular navigation journeys 1304, which may trigger the system to commence a series of operations identifying which navigation step in which abandonment has occurred. For example, the system may determine whether the abandonment of a user journey occurred at any of a session abandonment 1502, a browser abandonment 1504, a search abandonment 1506, a form abandonment 1508, an onboarding/signup abandonment 1510, a wish list abandonment 1512, a checkout abandonment 1514, or a cart abandonment 1516. Each identified abandonment type may be recorded at an ML/AI enabled decision cluster (e.g., cluster 1000a).

The ML/AI enabled decision cluster 1000a may analyze and configure system responses based on a particular abandonment type. For example, cluster 1000a may assess the abandonment type by comparing characteristics of user journeys within a website or an app, user input, user timing of abandonment, etc. and may direct system 916 to obtain assets from client assets aggregator 910 and/or sub-client assets aggregator 914 to compile and handoff gathered assets to message creation engine 906, which automatically generates a follow-on system abandonment message embedded with the characteristics defined by the ML/AI enabled decision cluster 1000a. The cluster 1000a may further include pre-written message content and/or message content that is generated through real time machine learning analysis (e.g., on the fly, at request, etc.) within the machine learning/AI enabled decision cluster 1000a to provide timely, accurate, and targeted content relative to the subscriber vault subscriber(s) 908 campaign message recipient(s) prior engagement characteristics and/or any other determinative subscriber vault subscriber(s) 908 campaign message recipient(s) details previously learned at the ML/AI enabled decision cluster 1000a. Such content may enable message creation engine 906 to automatically compile a new message to be sent to the subscriber vault subscriber(s) 908 campaign message recipient(s), whereupon 302 short link encoder/compiler 926 and/or other engagement method that may generate a new link using characteristics defined in machine learning/AI enabled decision cluster 1000a. The characteristics may be compiled into a final message that may be placed in a queue at automated message scheduler and distribution hub 1000e. The hub 1000e may use the information formulated and compiled by cluster 1000a to determine subscriber vault subscriber(s) campaign message recipient(s) to be selected from subscriber vault 908 for receiving generated follow-on abandonment messages. When the follow-on abandonment messages are sent by the system at an allocated distribution time queued into automated message scheduler and distribution hub 1000*e* by the cluster 1000*a*, the third party service provider API endpoint 920 receives an API call from the system defining which client/sub-client program message campaign number(s) 930 are to be used to send the follow-on abandonment messages through to the relevant third party cellular carriers 1520. The follow-on abandonment messages may be truncated to the appropriate messaging recipient cell number(s) 1522 that undertook a specific type of abandonment at a specific time and/or journey location within the originating navigation/application pages for user journey 1304 or 1328, which may be received in subscriber vault subscriber(s) 908 campaign message recipient(s) cellular phone messaging apps 1524, where the new short link encoder/compiler and/or engagement method compiled link and/or other engagement method is available to subscriber vault subscriber(s) 908 campaign message recipient(s) to activate and engage with the new navigation/application pages associated with a new user journey (associated with journey 1304 or 1328), which may define which specific type of abandonment journey the new short link encoder/compiler compiled link and/or engagement method provides relative to the characteristics defined by the cluster 1000*a* to place the subscriber vault subscriber(s) 908 campaign message recipient(s) within a newly created 1528 customized UEMWEB loader and/or third party domain property that enables the 908 subscriber vault subscriber(s) campaign message recipient(s) to commence the new navigation/application pages of the new user journey (associated with journey 1304 or 1328) from where the user abandoned the originating journey 1304 or 1328. From the new UEMWEB loader or third party domain property 1528, the process 1500 may return to automated security verification hub 1200 to further authenticate or access content at the new property (e.g., link) 1528.

Figure 16:
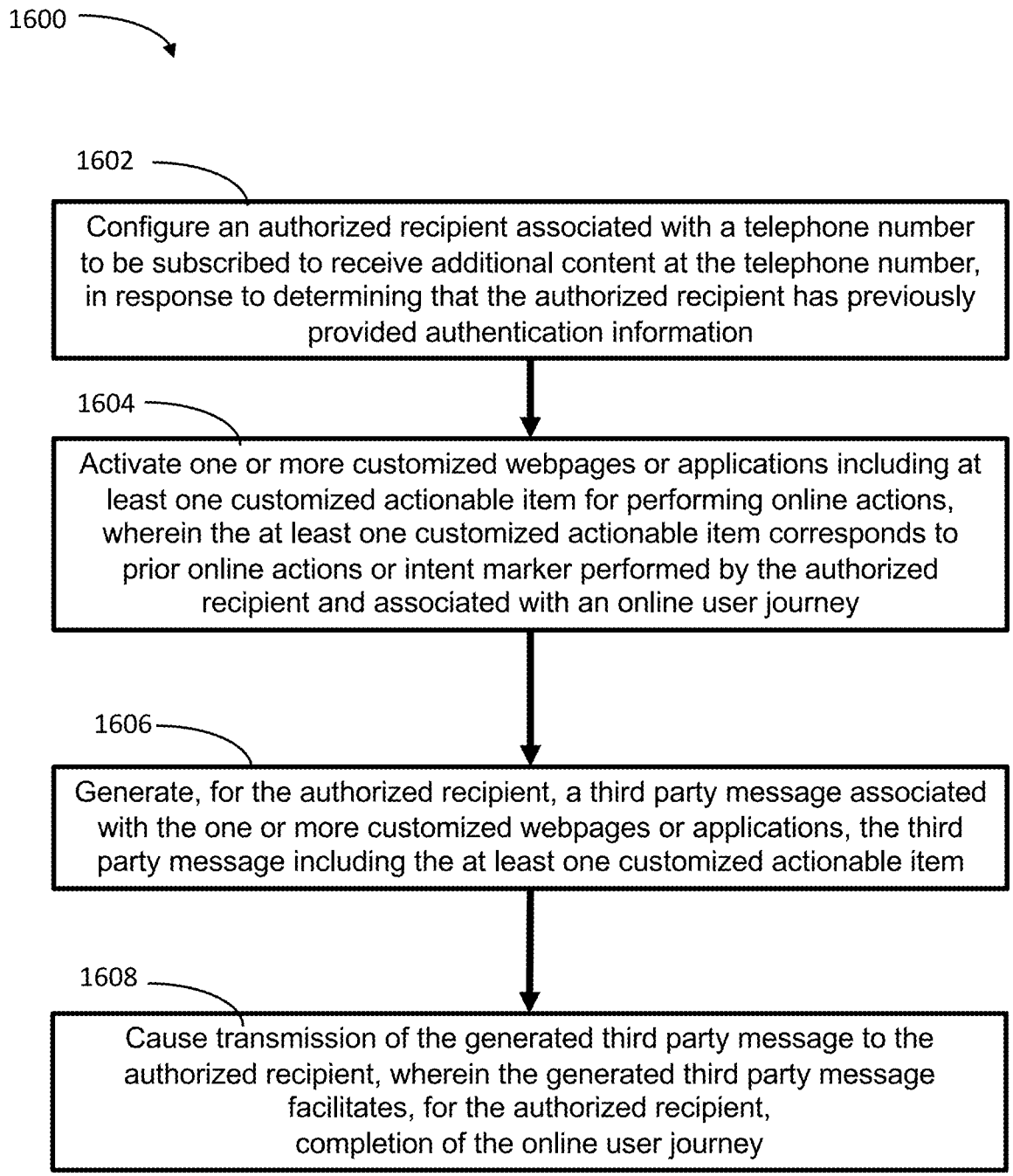
FIG. 16 is a flow diagram of an example process for providing a user access to one or more abandoned carts or abandoned user journeys, in accordance with an embodiment of the present disclosure.

FIG. 16 is a flow diagram of an example process 1600 for providing a user access to one or more abandoned carts or abandoned user journeys. The process 1600 is a computer-implemented method for providing a user (e.g., subscriber) access to an abandoned cart or abandoned user journey to enable the user to complete a purchase or journey. The process 1600 may include any combination of the steps described in FIG. 15.

In some embodiments, a link or actionable item customized to the journey of the user may be provided to enable the user to return to an abandoned journey or cart. When the customized link is selected by an authorized recipient (e.g., user, a subscriber, etc.), a hot cookie on the mobile device belonging to the user can trigger the silent network authentication protocol layer 924 to execute a security check that ties the authorized recipient to a mobile phone number, a client identifier of the marketing entity, and a client entity keyword in order to generate a pass status (e.g., pass status 1100*g* of FIG. 11) that enables the browser (or application) to open up to the last page in which the subscriber was navigating at a time of abandoning a particular user journey, as described elsewhere herein.

At block 1602, the process 1600 may include configuring an authorized recipient associated with a telephone number (e.g., client device 110-1), to be subscribed to receive additional content at the telephone number, in response to determining that the authorized recipient has previously provided authentication information. For example, the process 1600 may determine that a user has provided opt in permission or user permissions, in general, to receive follow on communications at the telephone number when the user is determined to be a previously authorized recipient.

At block 1604, the process 1600 may include activating one or more customized webpages including at least one customized actionable item for performing online actions. The activating may include generation of secure access information for performing the online actions, as described in detail in FIG. 15. The at least one customized actionable item may correspond to prior online actions or intent marker(s) performed by the authorized recipient and associated with an online user journey. For example, the recipient may carry out a user journey including shopping, browsing, form filling, searching, or the like and may abandoned the journey (or cart or other event/executable) associated with steps of the journey. In another example, the at least one customized actionable item may correspond to prior intent markers indicated during the user journey. Example intent markers may include any or all of partial entry of purchase information, partial entry of form information, partial entry of contact information, all or a portion of online browsing history, application browsing paths, keyword or other user input, geolocation of the mobile computing device during the journey, or other data indicating an intention of an end goal of the authorized recipient with respect to the webpage or user journey. In some embodiments, the process 1600 includes activating one or more customized applications (instead of webpages) where the one or more customized applications include the at least one customized actionable item for performing the online actions.

At block 1606, the process 1600 may include generating, for the authorized recipient, a third party message associated with the one or more customized webpages or applications, as described in FIGS. 9 and 15. The third party message may include the at least one customized actionable item. In some embodiments, the at least one customized actionable item may include a secure link or actionable item, corresponding to an identity of the authorized recipient, to resume the online user journey at the access point and one or more prompts to complete the online user journey. In some embodiments, selection of the secure link, on a computing device displaying the secure link, may trigger a silent network authentication protocol (e.g., hub 1200 using SNAP verification automation layer 1208) to confirm the identity of the authorized recipient, as described in at least FIG. 12. In some embodiments, the silent network authentication protocol is performed by a third party associated with the generated third party message, and accessed through a mobile device carrier.

At block 1608, the process 1600 may include causing transmission of the generated third party message to the authorized recipient. The generated third party message may facilitate, for the authorized recipient, completion of the online user journey by providing access to an access point corresponding to the prior online actions or intent marker. For example, if the online user journey includes online shopping, the third party message may include links, actions, or other interactive content that may be selected to return the authorized recipient to resume the online shopping journey. Other examples are of course possible, and as such, the third party message may include links, actions, or other interactive content that may be selected to return to one or more of: an abandoned online cart associated with the prior online actions or intent marker, an abandoned online purchase associated with the prior online actions or intent marker, or an abandoned online wish list associated with the prior online actions or intent marker. In some embodiments, the at least one customized actionable item may include one or more links, one or more buttons, one or more carousels, one or more interactive content items, or the like.

In some embodiments, the online user journey may include online browsing associated with at least one of: an abandoned online browsing session associated with the prior online actions or intent marker, an abandoned online session associated with the prior online actions or intent marker, an abandoned online search session purchase associated with the prior online actions or intent marker, and an abandoned online form associated with the prior online actions or intent marker. In such examples, the at least one customized actionable item may include one or more links, one or more buttons, one or more interactive content items, or the like.

In some embodiments, the generated third party message may include an RCS message including at least one user interface element to select amongst one or more of: an abandoned online cart associated with the prior online actions or intent marker, an abandoned online purchase associated with the prior online actions or intent marker, an abandoned online wish list associated with the prior online actions or intent marker, an abandoned online browsing session associated with the prior online actions or intent marker, an abandoned online session associated with the prior online actions or intent marker, an abandoned online search session purchase associated with the prior online actions or intent marker, and an abandoned online form associated with the prior online actions or intent marker. In some embodiments, the generated third party message may include an RCS message with at least one user interface element to select to complete an online user journey.

Rich Communication Service (RCS)

In some embodiments, the messages, actions, and links generated by the systems described herein (e.g., the AMDA 1000) may be Rich Communication Services (RCS) content/messages. For example, such content/messages may be generated and provided according to the RCS messaging protocol to enhance and modernize an SMS or an MMS communication, for example. In operation, a user may have devices and service providers that support RCS messaging. In some embodiments, the user may enable RCS through a messaging app or mobile device carrier settings. When RCS is enabled and configured, a phone number of the user may be registered with an RCS server, for example, for use in processes for identifying the user and enabling other features of RCS messaging. Users may generate and/or receive RCS messages that include text, rich media (e.g., images, videos, audio messages), and/or interactive elements (e.g., links, carousels, quick reply user interface elements, actions, or other actionable interactive content etc.), read receipts, and typing indicators. Users may also use such features during group chat and group sharing.

In some embodiments, when an RCS message is sent to a mobile computing device, the RCS message may utilize an RCS server to handle transmission, format compatibility with recipient devices and/or networks, and delivery receipts/status. The mobile computing device receiving the message may display rich media, text, and/or interactive elements through a messaging app or browser to display content and interactive elements within the message. Recipients can interact with the rich media, etc. such as responding to quick replies, engaging with interactive content, taking an action with respect to the content, and/or viewing media.

In some embodiments, the RCS server may enable ongoing conversations to be maintained and enhanced with additional features utilizing one or more device manufacturers and mobile carriers associated with devices sending and/or receiving RCS messages. In some embodiments, the systems described herein may generate an SMS or an MMS message as a fallback in the event that RCS messaging is unavailable or unsupported.

Figure 17:
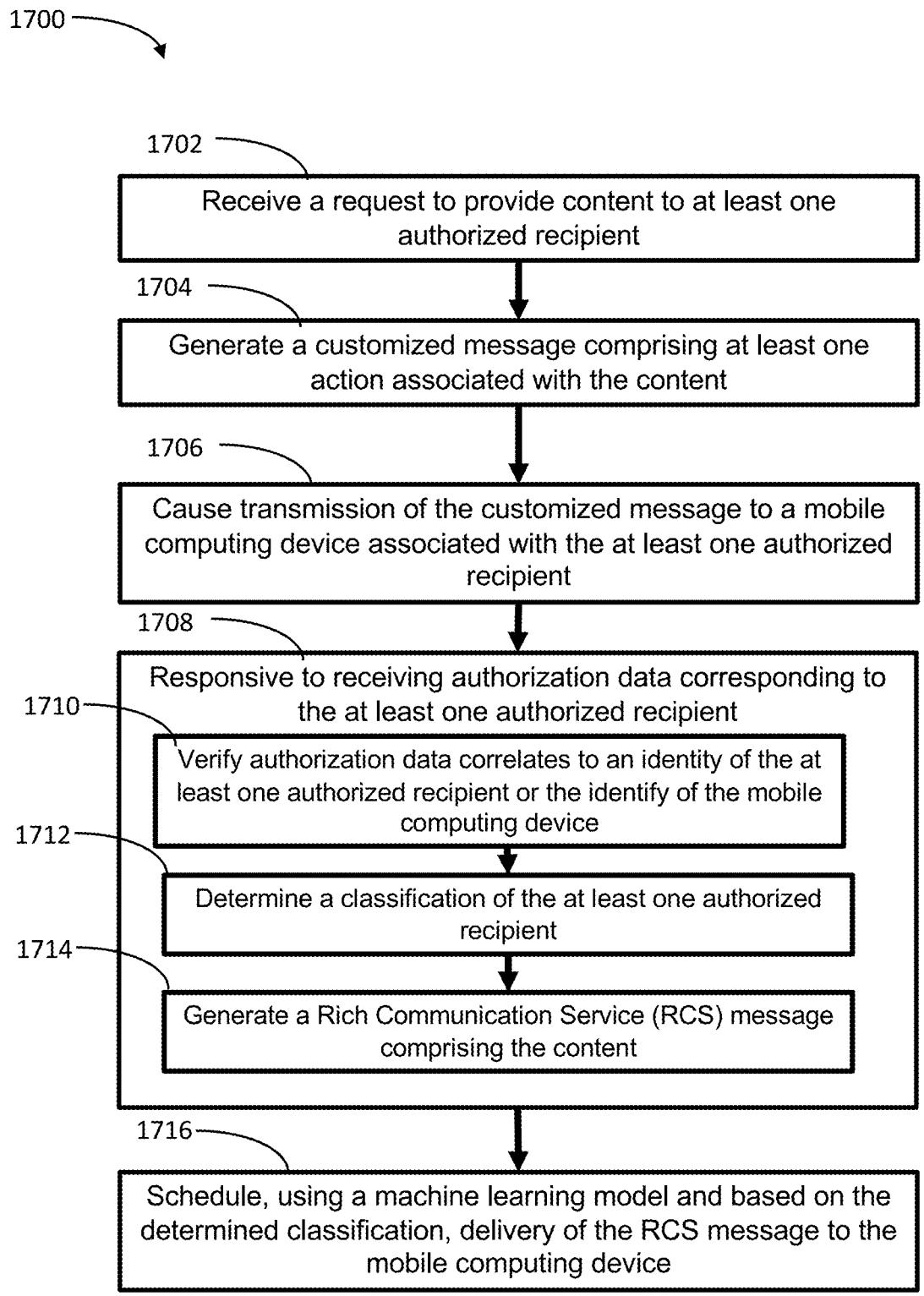
FIG. 17 is a flow diagram of an example process for generating and sending rich communication service messages, in accordance with an embodiment of the present disclosure.

FIG. 17 is a flow diagram of an example process 1700 for generating and sending rich communication service (RCS) messages, in accordance with an embodiment of the present disclosure. The process 1700 is a computer-implemented method for generating and sending secure RCS messages to a user (e.g., subscriber). The RCS messages may include content such as one or more web links, one or more UEMWEB links, one or more actions, text, media, and/or interactive elements. Each recipient of such content may be an authorized recipient, service subscriber, or other subscriber to content.

At block 1702, the process 1700 may include receiving a request to provide content to at least one authorized recipient. The request may be a direct request from a user device, such as device 110-1 that may request a dynamically generated customized message. In some embodiments, the request may be received from a third party requesting to send a dynamically generated customized message to an intended message recipient as a subscriber or other authorized recipient associated with the third party. The authorized recipient may be a subscriber that has authorized marketing and/or other promotional type messages, a user that has authorized transactional type messages, reminders, alerts, delay notifications, or the like.

At block 1704, the process 1700 may include generating a customized message comprising at least one action associated with the content. For example, the automated message distribution array (AMDA) 1000 may utilize machine learning/AI enabled decision cluster 1000*a* to generate the message according to preferences of a user (subscriber, authorized recipient, etc.), location of the user, time zone of the user, etc. The customized message may include an action to perform a purchase, view content, opt into receiving additional messages or content, or the like. In some embodiments, the at least one action associated with the content includes one or more options to perform a transaction, select a suggested response, return to a prior browsing session, or return to a prior application session. In some embodiments, the customized message may include a secure link to access additional content, may include an action to perform a purchase, view content, opt into receiving additional messages or content, or the like.

At block 1706, the process 1700 may include causing transmission of the customized message to a mobile computing device associated with the at least one authorized recipient. For example, in response to the received request to provide/receive content, the cluster 1000*a* may provide the content including the at least one action (and/or link(s)) to a mobile number associated with a mobile computing device of the authorized recipient. This may include providing such a message according to protocols and guidelines associated with the mobile computing device service provider and/or guidelines associated with providing messages to users.

At block 1708, the process 1700 may include, requesting authorization data corresponding to the at least one authorized recipient, responsive to receiving an indication associated with selecting the at least one action. For example, the user (e.g., authorized recipient) may select upon or otherwise indicate execution of instructions associated with one or more portion of the content provided in the message. For example, the authorized recipient may select upon or otherwise request execution of instructions associated with the action, which may trigger a security process to authorize that the authorized recipient may be provided access to the content. Responsive to receiving the requested authorization data, at block 1710, the process 1700 includes verifying that the authorization data correlates to an identity of the at least one authorized recipient or an identity of the mobile computing device, as described in detail in various aspects of FIGS. 9, 11, and 12.

At block 1712, the process 1700 may include determining, based on the identity of the at least one authorized recipient or the identity of the mobile computing device, a classification of the at least one authorized recipient. For example, the ML/AI cluster 1000a may classify (e.g., categorize) authorized recipients. The classifications may include criteria associated with an application, website, or service. In some embodiments, the criteria may be based on user behavior. In some embodiments, the criteria may be based on user input and/or preferences. In some embodiments, the criteria may be based on a level of engagement with particular content.

At block 1714, the process 1700 may include generating, based on the determined classification a Rich Communication Service (RCS) message comprising the content. Each RCS message may be customized for each authorized recipient with customized content determined to be relevant to the particular authorized recipient. Customized text, rich media (e.g., images, videos, audio messages), and/or interactive elements (e.g., links, carousels, quick reply user interface elements, actions, or other actionable interactive content etc.), read receipts, and/or typing indicators may be included in the customized messages. For example, the systems and methods described herein may generate and transmit RCS messages that may include any combination of customized text and images, rich media (e.g., images, videos, audio messages), and/or interactive elements (e.g., links, carousels, quick reply user interface elements, actions, or other actionable interactive content etc.), read receipts, and/or typing indicators.

For example, depending on one or more of the criteria, the RCS message may be generated by the automated just-in-time messaging array 1000c or the automated bulk messaging array 1000d. Such messages may include portions of content depending on the classification. In some embodiments, the content includes a carousel of selectable options in a user interface of the mobile computing device. In such examples the selectable options may include executable content for performing at least one secure transaction, executable content for scheduling an appointment, or executable content for resuming at least one abandoned user journey. In some embodiments, the content may be provided in the user interface and the user interface is within a browser executing on the mobile computing device.

In some embodiments, the content include send and receive indicators provided in a user interface of the mobile computing device. Such indicators indicate real time typing between an RCS message provider and the mobile computing device or between another computing device and the mobile computing device.

At block 1716, the process 1700 includes scheduling, using a machine learning model and based on the determined classification, delivery of the RCS message to the mobile computing device. For example, the automated messaging scheduler and distribute hub 1000e may schedule the RCS message (or other message type) based on whether the classification utilized array 1000c or array 1000d. In some embodiments, the hub 1000e may instead, alternatively or also generate an SMS/MMS message, using system 1000e1, an OTT message using system 1000e2, or other social channel using system 1000e3. Such additional or alternative messaging may be generated based on detecting an initial engagement, transaction, or other action occurred on a particular system/network. For example, if an initial engagement with content from an authorized recipient is detected on a specific messaging or social platform, then the system 1000 can generate and schedule the message with platform-specific formatting, content, and/or protocols. The process 1700 may further include delivering the RCS message (or other message type) to the mobile computing device according to the scheduled delivery.

In one non-limiting example, the classification options described herein may include a first tier that includes authorized recipients that have selected or performed one or more actions or links provided in prior RCS messages provided by the system 1000 and received at the mobile computing device (e.g., device 110-1) and in which such recipients have completed one or more transactions based on the selected or performed one or more actions and/or links in the messages. The classification options may further include a second tier including authorized recipients that have selected or performed the one or more actions or links provided in the prior RCS messages, but have not used the one or more actions or links to perform a transaction. The classification options may further include a third tier including authorized recipients that have not selected or performed the one or more actions or links provided in the prior RCS messages. In such an example set of classifications, the AMDA subscriber vault 1000b may function with the ML/AI cluster 1000a to tier the authorized recipients into one of the classification options. In some embodiments, being categorized into the first tier classification or the second tier classification may cause the RCS message (or other message type) to be scheduled for automated delivery using a just-in-time messaging array 1000c generated by the ML/AI cluster 1000a. In some embodiments, the third tier classification may cause the RCS message (or other message type) to be scheduled for automated bulk message delivery using an automated bulk messaging array 1000d.

In some embodiments, the process 1700 may further include determining a sender of the RCS message as a basis in which to verify the sender before scheduling and sending the RCS message. Responsive to failing to authorize the determined sender of the RCS message, the system 1000 may deliver, according to the scheduled delivery, an SMS message indicating a warning about the RCS message. For example, the warning may include a version of the message or a sender of the message and a link or other indication for authorizing the determined sender in order to receive the full RCS message.

In some embodiments, the process 1700 may further include determining a sender of the RCS message and responsive to receiving authorization for the determined sender of the RCS message, delivering the RCS message to the mobile computing device according to the scheduled delivery.

Figure 18:
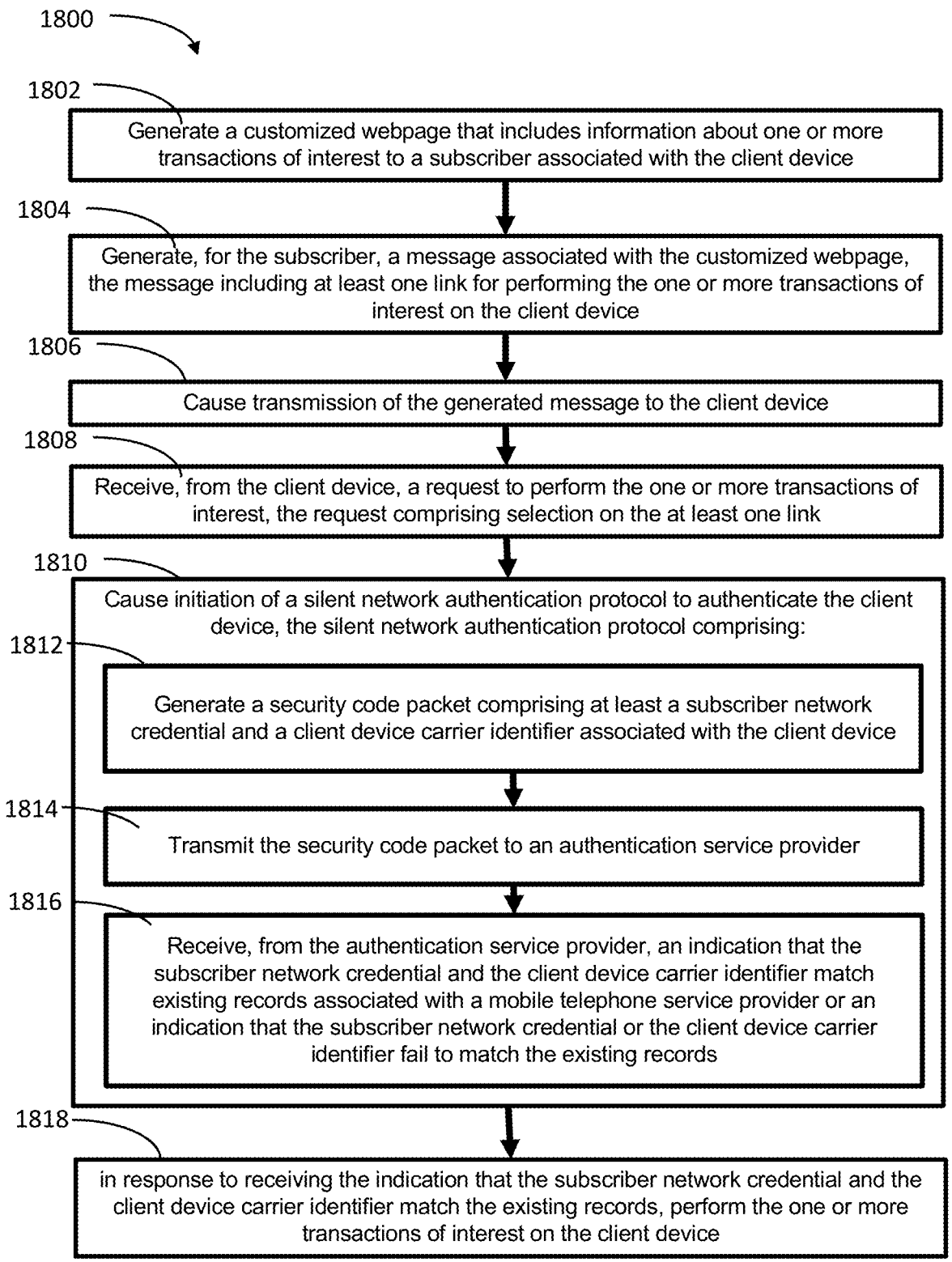
FIG. 18 is a flow diagram of an example process of using silent network authentication protocol process, in accordance with an embodiment of the present disclosure.

FIG. 18 is a flow diagram of an example process 1800 of using a silent network authentication protocol, in accordance with an embodiment of the present disclosure. The process 1800 is a computer-implemented method for providing a user (e.g., subscriber) access to carry out one or more actions or transactions. The process 1800 may be carried out, in general, by the ADDP 410 and the AMDA 1000 in combination with the SNAP access and security automation layer 1100, the automated security verification hub 1200, and the SNAP verification layer 1308, as described in FIGS. 9-14. The access may be in the form of a link or other executable content or element. The access may be provided in a message having content where the content may include the one or more web links, one or more UEMWEB links, one or more actions, text, media, and/or interactive elements. Each recipient of such content may be an authorized recipient, service subscriber, or other subscriber to content.

At block 1802, the process 1800 may include generating, a customized webpage that includes information about one or more transactions of interest to a subscriber associated with the client device. For example, the customized webpage may be generated by the AMDA 1000, which may utilize machine learning/AI enabled decision cluster 1000*a* to generate the webpage according to preferences of a user (subscriber, authorized recipient, etc.), location of the user, time zone of the user, etc.

At block 1804, the process 1800 may include generating, for the subscriber, a message associated with the customized webpage. The message may be for the subscriber, but may be generated for a third party such that the third party may provide the message to the subscriber. For example, if the customized webpage includes one or more selectable elements associated with the third party and the subscriber selects upon (or otherwise interacts with) one or more of the selectable elements (e.g., a hosted field, a link, a form, etc.), then the process 1800 may generate the message and send the message to the third party to allow the third party to await an indication form process 1800 of when and where to send the message. Alternatively, the process 1800 may directly generate and send the message.

In general, the message may include at least one link or selectable action for performing the one or more transactions of interest on the client device. For example, the AMDA 1000 may generate the message. In some embodiments, the customized message may include a selectable action to perform a purchase, view content, opt into receiving additional messages or content, or the like. In some embodiments, the selectable action may include one or more options to perform a transaction, select a suggested response, return to a prior browsing session, or return to a prior application session. In some embodiments, the message may include a secure link to access or purchase additional items or content.

At block 1806, the process 1800 may include causing transmission of the generated message to the client device. For example, the client device is associated with the subscriber based on the telephone number and/or device registration. Thus, when the message is indicated to be sent by a third party and/or permission is given to send the message, the process 1800 may send (or trigger sending from another party) the generated message to the client device.

At block 1808, the process 1800 may include receiving, from the client device, a request to perform the one or more transactions of interest. For example, the subscriber may use the client device to generate such a request by selecting on the at least one link in the message. Other actions are of course possible depending on the actionable items, selectable content, and/or other functionality available in the message.

At block 1810, the process 1800 may include causing, based on the received request, initiation of a silent network authentication protocol to authenticate the client device. The silent network authentication protocol may include a number of subprocesses as described in FIGS. 9-14. In one non-limiting example, at block 1812, the process 1800 may include generating a security code packet that includes at least a subscriber network credential and a client device carrier identifier associated with the client device.

The security code packet may include one or more of: a request to verify the subscriber network credential (e.g., a mobile telephone number associated with a user account corresponding to the subscriber), a request to verify the client device carrier identifier (e.g., a SIM card identifier associated with the client device), and a request to verify a network usage pattern associated with the client device, as described elsewhere herein. In some embodiments, the subscriber network credential may further include user pattern or behaviors including, but not limited to browser type and version, operating system and version, screen resolution, time zone, language settings, device model, IP address, etc.

In some embodiments, the client device carrier identifier corresponds to a subscriber identity module (SIM) card associated with the client device and in such examples, the silent network authentication protocol may be carried out using cellular data associated with the client device for at least a portion of the protocol.

In some embodiments, authenticating the client device using the silent network authentication protocol may include enabling the client device to securely access content at the link and securely carry out the one or more transactions of interest. In such examples, the authentication service provider may be a cellular network carrier.

At block 1814, the process 1800 may include transmitting, the security code packet to an authentication service provider. For example, the security code packet may be transmitted from a first endpoint (e.g., webhook 1100*c*) in the automation layer 1100 to a second endpoint at a third party authenticator (e.g., an API provided by the third party authenticator), as described in detail in FIG. 11. For example, transmitting the security code packet to the authentication service provider may include using a first application programming interface corresponding to a first application (e.g., SNAP layer 1100, SNAP layer 1208, etc.) to communicate with a second application programming interface corresponding to a second application (e.g., the third party authenticator, cellular network authenticator, etc.) associated with the authentication service provider. The transmission may be configured to request validation of the client device to access content at the at least one link and to execute purchases associated with the one or more transactions of interest.

At block 1816, the process 1800 may include receiving, from the authentication service provider, an indication that the subscriber network credential and the client device carrier identifier match existing records associated with a mobile telephone service provider (e.g., cellular service provider) or an indication that the subscriber network credential or the client device carrier identifier fail to match the existing records. For example, a matching process may be performed between layer 1100 and cellular network provider API or other third party authenticator API.

At block 1818, the process 1800 may include performing the one or more transactions of interest on the client device in response to receiving the indication that the subscriber network credential and the client device carrier identifier match the existing record. In the event that the indication received indicates a failed match, the process 1800 may instead generate alternative requests, denial requests, etc. For example, in response to receiving the indication that the subscriber network credential or the client device carrier identifier fail to match the existing records, the process 1800 may generate an alternate request to authenticate the client device without the silent network authentication protocol. The alternate request to authenticate the client device may include generating a PIN code associated with the one or more transactions of interest, and triggering the authentication service provider to provide the PIN code to the client device in a generated text message, enabling the client device to securely access content at the link in the text message and securely carry out the one or more transactions of interest. In some embodiments, the alternate request includes the use of non-cellular data associated with the client device. In some embodiments, the alternate request includes the use of Wi-Fi data, wired Internet systems, or other wired or wireless protocol to authenticate the client device.

In some embodiments, authenticating the client device using the silent network authentication protocol may include obtaining a pre-existing encryption string associated with the client device, the SIM card, and communication with a device carrier network and verifying, based on the obtained pre-existing encryption string, that the client device is the device in which the SIM card was previously activated and in which the device carrier network previously validated.

The systems described herein may function with appropriately configured user permissions. For example, the alerts, messages, texts, and/or other communications triggered by the systems described herein are generated and sent according to prior user permissions from a user/subscriber.

While examples of numerical values are provided in the preceding discussion, in other embodiments different numerical values are used. Consequently, the numerical values provided are not intended to be limiting.

The systems and methods described herein and variations thereof can be embodied and/or implemented at least in part as a machine configured to receive a computer-readable medium storing computer-readable instructions. The instructions may be executed by computer-executable components integrated with the system and one or more portions of the processor on the nasal assemblies described herein and/or computing devices 801. The computer-readable medium can be stored on any suitable computer-readable media such as RAMs, ROMs, flash memory, EEPROMs, optical devices (e.g., CD or DVD), hard drives, floppy drives, or any suitable device. The computer-executable component may include any suitable dedicated hardware or hardware/firmware combination that can alternatively or additionally execute the instructions.

A computer program product can be tangibly embodied in an information carrier. The computer program product may also contain instructions that, when executed, perform one or more methods and/or computer-implemented methods described herein. The information carrier may be a computer- or machine-readable medium, such as the memory or other storage associated with the devices and/or processors described herein.

References in the specification to "one embodiment," "an embodiment," "an illustrative embodiment," "some embodiments," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used in the description and claims, the singular form "a", "an" and "the" include both singular and plural references unless the context clearly dictates otherwise. For example, the term "sensor" may include, and is contemplated to include, a plurality of sensors. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A system comprising:
a processor; and
memory configured to store program instructions, wherein, when executed by the processor, the program instructions cause the processor to perform operations comprising:
providing a hosted input field for inclusion in a first document associated with a third party;
receiving, information indicating activation of the hosted input field in the first document, wherein the information comprises an electronic address associated with an electronic device and an indication of a willingness to receive one or more messages;
generating, a second document that includes information about one or more events of interest for a user associated with the electronic address, the second document being customized to the user;

sending a message to the electronic address, wherein the message comprises a link to the second document, the link being configured to enable the user to access the second document to execute one or more transactions associated with the one or more events; and in response to determining activation of the link has occurred, causing provision of the second document to the electronic address, wherein the second document is configured to facilitate completion of a given transaction in the one or more transactions.

2. The system of claim 1, wherein the message comprises a Rich Communication Services (RCS) message provided to the electronic address according to a schedule generated based at least in part on a determined classification of the user.

3. The system of claim 2, wherein the classification of the user comprises criteria corresponding to an application, a website, or a service associated with the electronic address.

4. The system of claim 2, wherein the classification of the user indicates whether the user is:

a message recipient that has selected a link provided by the system to the electronic address and completed at least one prior transaction;

a message recipient that has selected a link provided by the system to the electronic address, but has not completed a transaction; or a message recipient that has not selected a link provided by the system to the electronic address.

5. The system of claim 1, wherein the message comprises a Rich Communication Service (RCS) message and the operations further comprise:

requesting and receiving authorization data corresponding to an identity of the user before causing provision of the second document to the electronic address.

6. The system of claim 1, wherein the message is an Enhanced Messaging Service (EMS) message.

7. The system of claim 1, wherein the message comprises content including send and receive indicators provided in a user interface of a mobile computing device associated with the electronic address, the indicators depicting real time typing between a message provider and the mobile computing device or between another computing device and the mobile computing device.

8. The system of claim 1, wherein the link is further configured to:

allow users other than the user to access the second document to browse the second document while prohibiting execution of the one or more transactions through the link for the users other than the user.

9. The system of claim 1, wherein the link is further configured with a security layer to provide augmented access or navigation attributes to the user.

10. The system of claim 1, wherein the link is further configured to enable the user to resume an online user journey associated with the given transaction.

11. The system of claim 1, wherein the second document comprises user-targeted content based on one or more prior engagement characteristics associated with the electronic address, wherein the prior engagement characteristics are determined using machine learning.

12. A computer-implemented method comprising:

providing a hosted input field for inclusion in a first document associated with a third party;

receiving, information indicating activation of the hosted input field in the first document, wherein the information comprises an electronic address associated with an electronic device and an indication of a willingness to receive one or more messages;

generating, a second document that includes information about one or more events of interest for a user associated with the electronic address, the second document being customized to the user;

sending a message to the electronic address, wherein the message comprises a link to the second document, the link being configured to enable the user to access the second document to execute one or more transactions associated with the one or more events; and in response to determining activation of the link has occurred, causing provision of the second document to the electronic address, wherein the second document is configured to facilitate completion of a given transaction in the one or more transactions.

13. The computer-implemented method of claim 12, wherein the message comprises a Rich Communication Services (RCS) message provided to the electronic address according to a schedule generated based at least in part on a determined classification of the user.

14. The computer-implemented method of claim 13, wherein the classification of the user comprises criteria corresponding to an application, a website, or a service associated with the electronic address.

15. The computer-implemented method of claim 12, wherein the message comprises a Rich Communication Service (RCS) message and the method further comprises:

requesting and receiving authorization data corresponding to an identity of the user before causing provision of the second document to the electronic address.

16. The computer-implemented method of claim 12, wherein the message is an Enhanced Messaging Service (EMS) message.

17. The computer-implemented method of claim 12, wherein the message comprises content including send and receive indicators provided in a user interface of a mobile computing device associated with the electronic address, the indicators depicting real time typing between a message provider and the mobile computing device or between another computing device and the mobile computing device.

18. The computer-implemented method of claim 12, wherein the link is further configured to:

allow users other than the user to access the second document to browse the second document while prohibiting execution of the one or more transactions through the link for the users other than the user.

19. The computer-implemented method of claim 12, wherein the link is further configured with a security layer to provide augmented access or navigation attributes to the user.

20. The computer-implemented method of claim 12, wherein the link is further configured to enable the user to resume an online user journey associated with the given transaction.

21. The computer-implemented method of claim 12, wherein the second document comprises user-targeted content based on one or more prior engagement characteristics associated with the electronic address, wherein the prior engagement characteristics are determined using machine learning.

22. A non-transitory computer-readable storage medium for use in conjunction with a processor, the computer-readable storage medium storing program instructions that, when executed by the processor, cause the processor to carry out operations comprising:

providing a hosted input field for inclusion in a first document associated with a third party;

receiving, information indicating activation of the hosted input field in the first document, wherein the information comprises an electronic address associated with an electronic device and an indication of a willingness to receive one or more messages;

generating, a second document that includes information about one or more events of interest for a user associated with the electronic address, the second document being customized to the user;

sending a message to the electronic address, wherein the message comprises a link to the second document, the link being configured to enable the user to access the second document to execute one or more transactions associated with the one or more events; and in response to determining activation of the link has occurred, causing provision of the second document to the electronic address, wherein the second document is configured to facilitate completion of a given transaction in the one or more transactions.

23. The non-transitory computer-readable storage medium of claim 22, wherein the message comprises a Rich Communication Services (RCS) message provided to the electronic address according to a schedule generated based at least in part on a determined classification of the user.

24. The non-transitory computer-readable storage medium of claim 23, wherein the classification of the user comprises criteria corresponding to an application, a website, or a service associated with the electronic address.

25. The non-transitory computer-readable storage medium of claim 22, wherein the message comprises a Rich Communication Service (RCS) message and the operations further comprise:

requesting and receiving authorization data corresponding to an identity of the user before causing provision of the second document to the electronic address.

26. The non-transitory computer-readable storage medium of claim 22, wherein the message comprises content including send and receive indicators provided in a user interface of a mobile computing device associated with the electronic address, the indicators depicting real time typing between a message provider and the mobile computing device or between another computing device and the mobile computing device.

27. The non-transitory computer-readable storage medium of claim 22, wherein the link is further configured to:

allow users other than the user to access the second document to browse the second document while prohibiting execution of the one or more transactions through the link for the users other than the user.

28. The non-transitory computer-readable storage medium of claim 22, wherein the link is further configured with a security layer to provide augmented access or navigation attributes to the user.

29. The non-transitory computer-readable storage medium of claim 22, the link is further configured to enable the user to resume an online user journey associated with the given transaction.

30. The non-transitory computer-readable storage medium of claim 22, wherein the second document comprises user-targeted content based on one or more prior engagement characteristics associated with the electronic address, wherein the prior engagement characteristics are determined using machine learning.

* * * * *